United States Patent
Zhai et al.

(10) Patent No.: US 8,584,049 B1
(45) Date of Patent: Nov. 12, 2013

(54) VISUAL FEEDBACK DELETION

(71) Applicants: Shumin Zhai, Los Altos, CA (US); Kurt Edward Partridge, Palo Alto, CA (US); Xiaojun Bi, Sunnyvale, CA (US); Yu Ouyang, San Jose, CA (US)

(72) Inventors: Shumin Zhai, Los Altos, CA (US); Kurt Edward Partridge, Palo Alto, CA (US); Xiaojun Bi, Sunnyvale, CA (US); Yu Ouyang, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/830,273

(22) Filed: Mar. 14, 2013

Related U.S. Application Data

(60) Provisional application No. 61/714,603, filed on Oct. 16, 2012.

(51) Int. Cl.
*G06F 3/033* (2013.01)
*G06F 3/01* (2006.01)

(52) U.S. Cl.
USPC .......................................... 715/863; 715/702

(58) Field of Classification Search
USPC ......... 715/863, 864, 702, 255, 256, 780, 268, 715/833, 823
See application file for complete search history.

(56) References Cited

U.S. PATENT DOCUMENTS

| | | | |
|---|---|---|---|
| 7,701,449 B2 | 4/2010 | Pettiross et al. | |
| 7,847,789 B2 | 12/2010 | Kolmykov-Zotov et al. | |
| 8,059,101 B2 | 11/2011 | Westerman et al. | |
| 2006/0055662 A1 | 3/2006 | Rimas-Ribikauskas et al. | |
| 2008/0316183 A1 | 12/2008 | Westerman et al. | |
| 2009/0066668 A1* | 3/2009 | Kim et al. | 345/173 |
| 2009/0077464 A1* | 3/2009 | Goldsmith et al. | 715/257 |
| 2010/0257457 A1 | 10/2010 | De Goes | |
| 2010/0333027 A1* | 12/2010 | Martensson et al. | 715/833 |
| 2011/0258537 A1 | 10/2011 | Rives et al. | |
| 2011/0320978 A1* | 12/2011 | Horodezky et al. | 715/823 |
| 2012/0011462 A1 | 1/2012 | Westerman et al. | |
| 2012/0216113 A1* | 8/2012 | Li | 715/702 |
| 2012/0216154 A1* | 8/2012 | Li | 715/863 |
| 2012/0223889 A1* | 9/2012 | Medlock et al. | 345/168 |
| 2013/0007606 A1* | 1/2013 | Dolenc | 715/256 |

OTHER PUBLICATIONS

Butcher, "SwiftKey Counters Swipe With a Smarter Version, Makes an In-Road Into Healthcare Market," Retrieved from http://techcrunch.com/2012/06/21/swiftkey-counters-swype-with-a-smarter-version-makes-an-in-road-into-healthcare-market/, Jun. 12, 2012, 2 pp.
Burns, "Nuance Supercharges Swype, Adds New Keyboard Options, XT9 Predictive Text, and Dragon-Powered voice Input," Retrieved from http://techcrunch.com/2012/06/20/nuance-supercharges-swype-adds-new-keyboard-options-xt9-predictive-text-and-dragon-powered-voice-input/, Jun. 20, 2012, 2pp.

* cited by examiner

*Primary Examiner* — Rashawn Tillery
(74) *Attorney, Agent, or Firm* — Shumaker & Sieffert, P.A.

(57) ABSTRACT

In one example, a method includes outputting, by a computing device and for display, a text display region comprising one or more characters. The method may further include outputting, in response to receiving an indication of an input unit detected at a first location of a presence-sensitive input device, a graphical indicator comprising a representation of a threshold distance. The method may further include receiving an indication of a gesture comprising movement of the input unit from the first location to a second location, and outputting a visual change of the graphical indicator corresponding to the movement of the input unit. The method may further include determining that a distance between the first location and the second location satisfies the threshold distance, and deleting, in response to determining that the threshold distance is satisfied, the one or more characters from the text display region.

20 Claims, 11 Drawing Sheets

VISUAL FEEDBACK DELETION

This application claims the benefit of U.S. Provisional Application No. 61/714,603, filed Oct. 16, 2012, the entire content of which is hereby incorporated by reference.

BACKGROUND

Some computing devices (e.g., mobile phones, tablet computers, etc.) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a display device of a computing device may output a graphical (or "soft") keyboard that enables the user to enter data by indicating (e.g., by tapping) keys displayed at the presence-sensitive display.

A graphical keyboard may enable a user to delete one or more portions of text by selecting a backspace key or delete key included in the graphical keyboard. For instance, certain techniques may enable a user to repeatedly select a backspace key included in the graphical keyboard to delete characters of text. In one example, each selection of the backspace key may delete a single character included in the text. Some techniques may enable a user to select and hold the backspace key to rapidly delete multiple characters. A user may, however, experience difficulty precisely deleting text when the backspace key is small in size relative to the input medium of a user (e.g., relative to the size of the user's fingers). As such, deleting characters when using a graphical keyboard may be difficult and may reduce the speed at which the user may interact with the computing device.

SUMMARY

In one example, a method includes outputting, by a computing device and for display, a text display region comprising one or more characters, and responsive to receiving an indication of an input unit detected at a first location of a presence-sensitive input device, outputting, by the computing device and for display, a graphical indicator comprising a representation of a threshold distance. The method further includes receiving, by the computing device, an indication of a gesture detected at the presence-sensitive input device, the gesture comprising movement of the input unit from the first location of the presence-sensitive input device to a second location of the presence-sensitive input device, and responsive to receiving the indication of the gesture, outputting, by the computing device and for display, a visual change of the graphical indicator corresponding to the movement of the input unit from the first location to the second location. The method further includes determining, by the computing device, that a distance between the first location and the second location satisfies the threshold distance, and deleting, by the computing device and in response to determining that the threshold distance is satisfied, the one or more characters from the text display region.

In another example, a computer-readable storage medium is encoded with instructions that, when executed, cause at least one processor of a computing device to output, for display, a text display region comprising one or more characters, and responsive to receiving an indication of an input unit detected at a first location of the presence-sensitive input device, output, for display, a graphical indicator comprising a representation of a threshold distance. The computer-readable storage medium is further encoded with instructions that, when executed, cause the at least one processor to receive an indication of a gesture detected at the presence-sensitive input device, the gesture comprising movement of the input unit from the first location of the presence-sensitive input device to a second location of the presence-sensitive input device, and responsive to receiving the indication of the gesture, output, for display, a visual change of the graphical indicator corresponding to the movement of the input unit from the first location to the second location. The computer-readable storage medium is further encoded with instructions that, when executed, cause the at least one processor to determine that a distance between the first location and the second location satisfies the threshold distance, and delete, in response to determining that the threshold distance is satisfied, at least a portion of the one or more characters from the text display region.

In another example, a device includes at least one processor, a presence-sensitive input device, and at least one module operable by the at least one processor to output, for display, a text display region comprising one or more characters, and responsive to receiving an indication of an input unit detected at a first location of the presence-sensitive input device, output, for display, a graphical indicator comprising a representation of a threshold distance. The at least one module is further operable by the at least one processor to receive an indication of a gesture detected at the presence-sensitive input device, the gesture comprising movement of the input unit from the first location of the presence-sensitive input device to a second location of the presence-sensitive input device, and responsive to receiving the indication of the gesture, output, for display at the presence-sensitive input device, a visual change of the graphical indicator corresponding to the movement of the input unit from the first location to the second location. The at least one module is further operable by the at least one processor to determine that a distance between the first location and the second location satisfies the threshold distance, and delete, in response to determining that the threshold distance is satisfied, the one or more characters from the text display region.

The details of one or more examples of the disclosure are set forth in the accompanying drawings and the description below. Other features, objects, and advantages will be apparent from the description and drawings, and from the claims.

DETAILED DESCRIPTION

Figure 1:
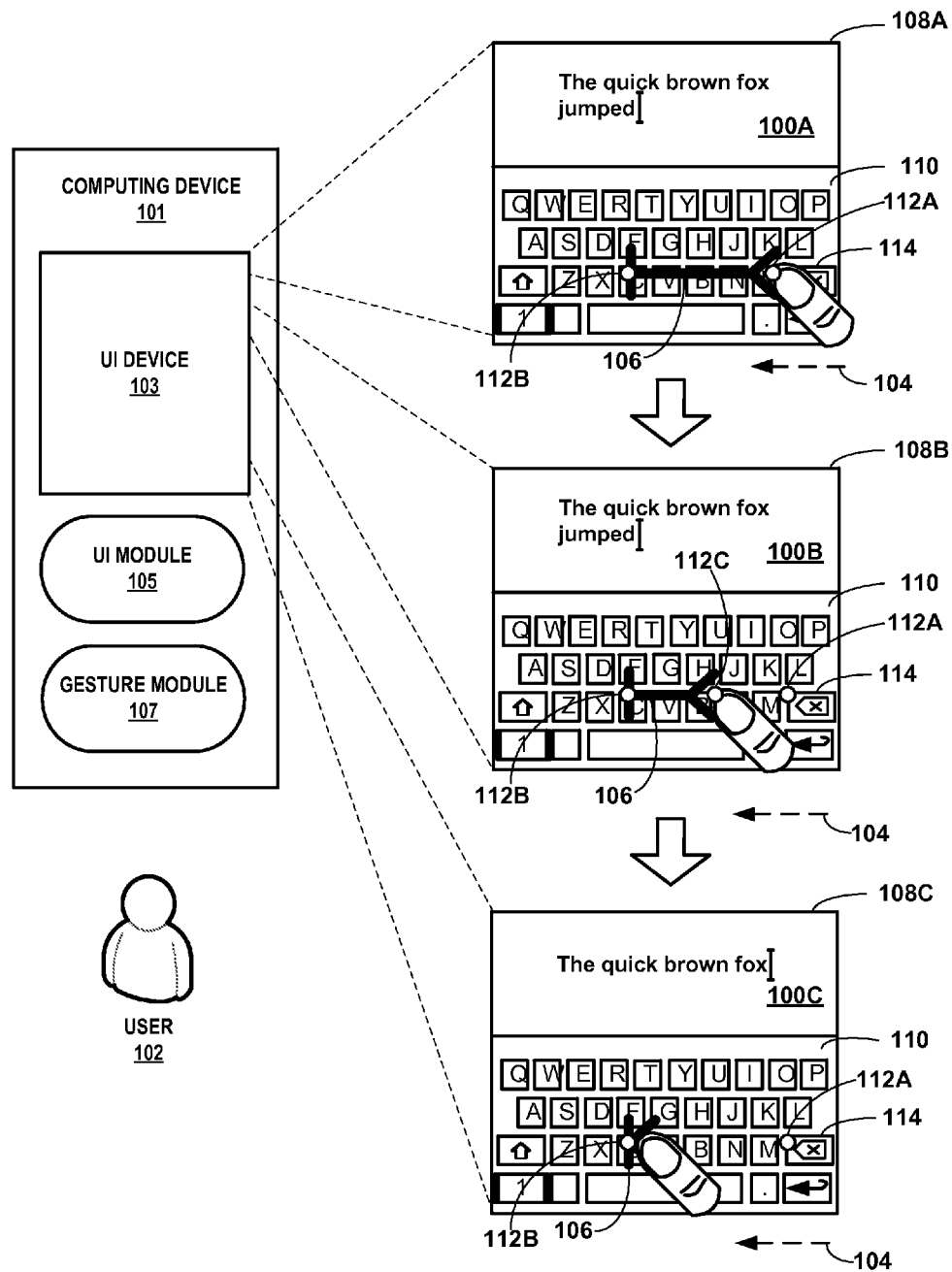
FIG. 1 is a block diagram illustrating an example computing device that may be used to display graphical content and delete one or more portions of the graphical content, in accordance with one or more techniques of the present disclosure.

In general, this disclosure is directed to techniques for deleting one or more displayed characters in response to determining that a gesture including movement from a first location of a presence-sensitive input device (e.g., a presence-sensitive display) to a second location of the presence-sensitive input device satisfies a threshold distance. In some examples, a a computing device may output graphical content for display, such as one or more characters associated with a typing, word-processing, or other character-based application. Conventionally, a user may delete one or more of the characters by performing one or more gestures at or near a presence-sensitive input device, such as a presence-sensitive display. For instance, a user may repeatedly select a backspace key included in a graphical keyboard to delete characters. Each selection of the backspace key may delete a single character included in the text. Similarly, some techniques enable the user to select and hold the backspace key to rapidly delete multiple characters.

In such conventional examples, to accurately delete multiple characters, such as a word, phrase, or line of text, a user must repeatedly press the backspace key multiple times or be accurate and focused enough to deselect the backspace key at the appropriate moment while the multiple characters are rapidly deleted. Such techniques may therefore result in unintended deletions of characters, such as more or fewer characters than are included in a word or phrase. Techniques described herein may improve the ease and accuracy with which a user may delete one or more characters of text using one or more gestures that are performed at the presence-sensitive input device.

According to various techniques of this disclosure, a computing device may output, for display (e.g., at a presence-sensitive display), a text display region including one or more characters, such as one or more characters included in a word, phrase, line, or paragraph of text. The computing device may receive an indication of an input unit (e.g., a finger, pen, stylus, and the like) detected at a first location of a presence-sensitive input device. The indication may include data representing a location of the presence-sensitive input device associated with a backspace key of a graphical keyboard. In response, the computing device may output a graphical indicator that includes a representation of a threshold distance that is satisfiable by gesture input from the first location of the presence-sensitive input device to a second location of the presence-sensitive input device. In response to receiving an indication of a gesture including movement of an input unit that satisfies the threshold distance, the computing device may delete at least a portion of the one or more characters from the text display region. Similarly, in response to receiving an indication of a gesture including movement of an input unit that does not satisfy the threshold distance, the computing device may refrain from deleting the one or more characters from the text display region.

In such a way, the computing device may enable a user to accurately delete one or more characters of text when the user provides gesture input including movement that satisfies a threshold distance. In addition, by outputting a graphical indicator including a representation of the threshold distance, the computing device may provide a visual indication to help guide the user in providing gesture input that satisfies the threshold distance to delete the one or more characters. As such, techniques of this disclosure may improve usability of a computing device by enabling a user to accurately delete an intended portion of displayed text. Moreover, in certain examples, the computing device may enable a user to recover one or more of the deleted characters (i.e., "undo" deletion) by providing one or more gesture inputs.

Techniques described herein may therefore provide new interactions for deleting words using gestures performed at a presence-sensitive input device. Moreover, techniques of this disclosure may enable precise single word deletion, quick multiword and multiline deletion, and easy deletion "undo" or recovery.

FIG. 1 is a block diagram illustrating an example computing device 101 that may be used to display graphical content and delete one or more portions of the graphical content, in accordance with one or more techniques of the present disclosure. In some examples, computing device 101 may be associated with user 102. A user associated with a computing device may interact with the computing device by providing various user inputs to the computing device. Examples of computing device 101 may include, but are not limited to, portable or mobile devices such as mobile phones (including smartphones), laptop computers, desktop computers, tablet computers, smart television platforms, personal digital assistants (PDA's), servers, mainframes, etc. Computing device 101, in some examples, may include user interface (UI) device 103, UI module 105, and gesture module 107. Other examples of computing device 101 that implement techniques of this disclosure may include additional components not shown in FIG. 1.

Computing device 101 may include UI device 103. In some examples, UI device 103 is configured to receive tactile, audio, or visual input. Examples of UI device 103 may include a touch-sensitive and/or a presence-sensitive screen, mouse, keyboard, voice responsive system, microphone, camera or other device for receiving input. For example, UI device 103 may include a presence-sensitive display that may detect the presence of an input unit (e.g., a finger, pen, stylus, and the like) performing, e.g., gesture 104. User 102 may provide gesture 104 at the presence-sensitive display of UI device 103. UI device 103 may output for display content such as graphical user interface (GUI) 108A-108C (collectively referred to herein as "GUIs 108"). GUIs 108 may include, respectively, text display regions 100A-100C (collectively referred to herein as "text display region 100"), graphical keyboard 110, or other such display regions. As illustrated in FIG. 1, GUIs 108 may include one or more graphical indicators 106 that may, in certain examples, represent a threshold distance.

As shown in FIG. 1, computing device 101 may include UI module 105. UI module 105 may perform one or more functions to receive input, such as user input, and send such input to other components associated with computing device 101, such as gesture module 107. UI module 105 may also receive data from components associated with computing device 101, such as application module 107. Using the data, UI module 105 may cause components associated with computing device 101, such as UI device 103, to provide output based on the data. For instance, UI module 105 may receive data from gesture module 107, and may cause UI device 103 to display GUIs 108 based on such data. In some examples, UI module 105 may include functionality associated with one or more applications executable by computing device 101, such as one or more of a word-processing application, text messaging application, spreadsheet, web browser, server application, or other applications. In certain examples, UI module 105 may be implemented as an application executable by one or more processors of computing device 101, such as a downloadable or pre-installed application or "app." In some examples, UI module 105 may be implemented as part of a hardware unit of computing device 101. As another example, UI module 105 may be implemented as part of an operating system of computing device 101.

As shown in FIG. 1, GUIs 108 may each be an interface generated by UI module 105 to enable user 102 to interact with computing device 101. GUIs 108 may each include graphical content. Graphical content, generally, may be any visually displayable graphical object of a graphical user interface. Examples of graphical content may include text, images, a group of moving images, hyperlink, animation, video, characters of a character set etc. As shown in FIG. 1, graphical content may include graphical indicator 106. UI module 105 may cause UI device 103 to display graphical indicator 106 in accordance with various techniques described herein.

Techniques of the present disclosure may improve the ease with which a user can delete characters, words, lines, or sentences, by providing one or more graphical indicators to help guide a user. Using techniques of this disclosure, instead of selecting a representation of a backspace key multiple times to delete a word from a sentence (e.g., providing multiple touch inputs to select a backspace key, each of the multiple touch inputs to delete a single character of a word or phrase), a user may provide an input from a first location of a presence-sensitive input device to a second location of the presence-sensitive input device. For example, in response to receiving an indication of a user input detected at a first location of the presence-sensitive input device (e.g., a presence-sensitive display, such as UI device 103 in some examples), UI module 105 may output, for display at UI device 103, a graphical indicator, such as graphical indicator 106 that includes a representation of a threshold distance. For instance, as illustrated in FIG. 1, graphical indicator 6 may extend from a first location to a second location and represent a threshold. A user may provide a gesture (e.g., a motion gesture such as a drag or swipe gesture) from the first location to the second location. UI module 105 may output a visual change of graphical indicator 6 in response to receiving one or more indications of the gesture, such as to help guide the user to provide an input that satisfies the threshold distance. In response to receiving an indication of the user input from the first location to the second location, gesture module 107, in certain examples, may cause UI module 105 to delete one or more characters (e.g., an entire word) displayed at text display region 100.

Similar thresholds, graphical indicators, and techniques may be used to delete or undelete lines, sentences, and individual characters based at least in part on one or more gestures detected at UI device 103. For instance, in certain examples, gesture module 107 may cause UI device 6 to delete an entire line of text displayed at text display region 100. As such, techniques disclosed herein may enable a user to conveniently delete characters or groups or characters while using a word-processing, text-messaging, or other character-based application. Moreover, by outputting a graphical indicator that represents a threshold distance, the techniques may enable a user to more precisely delete one or more portions of such text.

As shown in FIG. 1, UI module 105 may output graphical content including GUIs 108 for display at UI device 103 (e.g., a presence-sensitive display). GUIs 108 may include graphical keyboard 110 and text display region 100. UI module 105 may output one or more characters for display at text display region 100, such as characters selected during operation of a typing, word-processing, texting, or other character-based application. Such characters may include words and numbers in a variety of languages, as well as symbols, figures, lines, graphical images, and the like. For instance, as illustrated by GUI 108A of FIG. 1, UI module 105 may output the plurality of characters "The quick brown fox jumped" for display at text display region 100A. The plurality of characters may include one or more portions. For instance, the plurality of characters may include a portion that includes one or more characters of a word, such as the word "jumped" of the plurality of characters "The quick brown fox jumped". As another example, the plurality of characters may include a first portion that includes a first line of text, such as the line of text "The quick brown fox" and a second portion that includes a second line of text, such as the line of text "jumped". More generally, a portion of the plurality of characters may include any subgroup of one or more characters included in the plurality of characters.

Graphical keyboard 110 may include a plurality of selectable keys associated with one or more characters and/or symbols to enable user 102 to interact with text display region 100. In some examples, user 102 can provide input (e.g., touch input) to select one or more keys of graphical keyboard 110 that are associated with characters and/or symbols. For instance, graphical keyboard 110 may include backspace key 114. Backspace key 114 may be associated with a delete function of graphical keyboard 110. The delete function may cause UI module 105 to remove one or more characters from text display region 100 (e.g., delete one or more characters from text display region 100).

UI device 103 may detect an input unit (e.g., a finger, pen, stylus, and the like) at a first location of UI device 103 (e.g., a presence-sensitive and/or touch-sensitive display). For example, as illustrated in FIG. 1, UI device 103 may detect the presence of a finger of user 102 at first location 112A of GUI 108A. In certain examples, as illustrated in FIG. 1, location 112A may be a location of UI device 103 that is associated with backspace key 114 of graphical keyboard 110 (e.g., a location of UI device 103 that displays backspace key 114). In some examples, first location 112A may be a location of UI device 103 that is associated with a delete key of graphical keyboard 110 or other selectable icon displayed at GUIs 108. The delete key or other selectable icon may be associated with a delete function to cause UI module 105 to remove one or more characters from text display region 100.

UI module 105 may receive an indication of the input unit detected at first location 112A. In response to receiving the indication of the input unit detected at first location 112A of UI device 103, UI module 105 may output, for display at GUI 108A, a graphical indicator including a representation of a threshold distance. For example, as illustrated in FIG. 1, UI module 105 may output graphical indicator 106 that extends from first location 112A to second location 112B. As such, in the example of FIG. 1, graphical indicator 106, extending from first location 112A to second location 112B, may represent a threshold distance, such as the distance between first location 112A and second location 112B (e.g., a distance as measured in inches, millimeters, pixels, or other units of measurement). In such a way, graphical indicator 106 may include a visual representation of a threshold distance that is satisfiable by gesture input, such as gesture input that originates from first location 112A and ends at second location 112B.

Gesture module 107 may receive an indication of gesture 104 detected at UI device 103, the gesture including movement of the input unit (e.g., a finger of user 102 in this example) from first location 112A to second location 112B. In response to receiving the indication of gesture 104, gesture module 107 may cause UI module 105 to output a visual change of graphical indicator 106 corresponding to the movement of the input unit from first location 112A to second location 112B. In some examples, UI module 105 may output the visual change of graphical indicator 106 to indicate a distance between a location of UI device 103 that detects the input unit and second location 112B.

For example, UI device 103 may detect the presence of the input unit at locations of UI device 103 corresponding to gesture 104 as the user moves the input from first location 112A to second location 112B. For instance, as illustrated by GUI 108B of FIG. 1, UI device 103 may detect the input unit at third location 112C as the input unit traverses UI device 103 along gesture 104. As illustrated, UI module 105 may output a visual change of graphical indicator 106 to indicate a distance between third location 112C that detects the input unit and second location 112B.

While graphical indicator 106 is illustrated in the example of FIG. 1 as including a substantially horizontal orientation with respect to an orientation of text display region 100 (e.g., an orientation that extends horizontally along an orientation for which text is displayed, such as a left-to-right or right-to-left orientation), aspects of this disclosure are not so limited. For instance, in some examples, graphical indicator 106 may include a substantially vertical orientation (e.g., an orientation that extends vertically along an orientation for which text is displayed, such as an orientation that spans multiple lines of text displayed at text display region 100), a circular indicator, or other type of indicator.

Similarly, while in the example of FIG. 1 UI module 105 outputs the visual change of graphical indicator 106 for display to indicate a distance between a location of UI device 103 that detects the input unit and second location 112B, in certain examples UI module 105 may output the visual change of graphical indicator 106 in other ways. As one example, graphical indicator 106 may be a circular indicator. In such an example, UI module 105 may output the visual change of graphical indicator 106 corresponding to the movement of gesture 104 using the circular indicator, such as by highlighting or otherwise indicating an amount of the circular indicator that is proportional to the detected movement of gesture 104. As another example, a length of graphical indicator 106 may not correspond directly to the threshold distance, such as when the threshold distance is greater than or less than a length of graphical indicator 106. In such examples, UI module 105 may output a visual change of graphical indicator 106 corresponding to the movement of gesture 104, such as by changing a length of graphical indicator 106 by an amount that is proportional to the movement of gesture 104, or changing a color of graphical indicator 106 to indicate a movement of gesture 104 (e.g., a gradual change in color from green to red to indicate a proportion of the threshold distance that is traversed by gesture 104).

In general UI module 105 may output graphical indicator 106 as any indicator capable of representing a threshold distance, and may output a visual change of graphical indicator 106 in any manner corresponding to the movement of gesture 104 such as to indicate a proportion of the threshold distance that is traversed by gesture 104. In such a way, UI module 105 may output a visual indication of a portion of gesture 104 that remains to satisfy the threshold distance, thereby enabling a user to more accurately and precisely provide a gesture that satisfies the threshold distance to delete one or more characters included in text display region 100.

Gesture module 107 may determine that a distance between first location 112A and second location 112B traversed by gesture 104 satisfies the threshold distance. For instance, gesture module 107 may compare a distance between first location 112A and second location 112B traversed by gesture 104 (e.g., a linear distance measured by millimeters, inches, pixels, or other units of measurements) to the threshold distance. In some examples, gesture module 107 may determine that the distance between first location 112A and second location 112B satisfies the threshold distance when gesture module 107 determines that the distance between first location 112A and second location 112B is greater than the threshold distance. In other examples, gesture module 107 may determine that the distance between first location 112A and second location 112B satisfies the threshold distance when gesture module 107 determines that the distance between first location 112A and second location 112B is greater than or equal to the threshold distance. In yet other examples, gesture module 107 may determine that the distance between first location 112A and second location 112B satisfies the threshold distance when gesture module 107 determines that the distance between first location 112A and second location 112B is within a predetermined distance of the threshold distance, such as within one millimeter, three millimeters, ten pixels, or other predetermined distances.

In response to determining that the threshold distance is satisfied, gesture module 107 may cause UI module 105 to delete one or more characters from text display region 100. That is, by causing UI module 105 to delete the one or more characters, gesture module 107 may cause UI module 105 to cease to output the one or more characters for display at text display region 100. For example, as illustrated by GUI 108C of FIG. 1, gesture module 107 may receive an indication of gesture 104 that traverses UI device 103 from first location 112A to second location 112B. Gesture module 107 may determine that the distance between first location 112A and second location 112B satisfies the threshold distance. In response, gesture module 107 may cause UI module 105 to delete the one or more characters "jumped" from text display region 100C. As another example, in response to determining that the distance between first location 112A and second location 112B satisfies the threshold distance, gesture module 107 may cause UI module 105 to delete one or more lines of text included in text display region 100 (e.g., the line of text including the one or more characters "jumped", the line of text including the one or more characters "The quick brown fox", or both).

In certain examples, gesture module 107 may cause UI module 105 to delete one or more characters (e.g., a word, sentence, line of text, etc.) in response to receiving an indication of a gesture from a first location to a second location within a threshold amount of time. For instance, gesture module 107 may receive an indication of a "flick" gesture, such as a gesture from first location 112A to second location 112B within a threshold amount of time, such as one half of one second, one second, or other threshold amounts of time. In such examples, UI module 105 may not output graphical indicator 106, and may delete one or more characters in response to receiving the gesture from the first location to the second location within the threshold amount of time. In this way, gesture module 107 may enable a user to delete one or more characters of text by performing a quick "flick" gesture, such as a gesture originating from a location at or near a backspace key and/or delete key of a graphical keyboard.

In some examples, gesture module 107 may determine an orientation of gesture 104, and may cause UI module 105 to delete one or more characters included in text display region 100 based on the determined orientation of gesture 104 and the threshold distance. For instance, gesture module 107 may determine whether an orientation of gesture 104 is a substantially vertical orientation or a substantially horizontal orientation with respect to an orientation of GUIs 108. As an example, gesture module 107 may determine that a gesture includes a substantially horizontal orientation (e.g., gesture 104 as illustrated in FIG. 1) when a horizontal component (e.g., a left-to-right or right-to-left component with respect to an orientation of GUIs 108) of the gesture is greater in magnitude than a vertical component of the gesture (e.g., a component that is orthogonal to a horizontal orientation of GUIs 108). As another example (not illustrated), gesture module 107 may determine that a gesture includes a substantially vertical orientation when a vertical component of the gesture is greater in magnitude than a horizontal component of the gesture.

Gesture module 107 may, in certain examples, cause UI module 105 to delete one or more characters included in text display region 100 based on the determined orientation of the gesture input that satisfies the threshold distance. For instance, in response to determining that a gesture includes a substantially horizontal orientation, gesture module 107 may cause UI module 105 to delete one or more characters that form a word included in text display region 100. In response to determining that a gesture includes a substantially vertical orientation, gesture module 107 may cause UI module 105 to delete one or more characters that are included in a line of text of text display region 100.

As such, computing device 101 may detect a gesture (e.g., gesture 104) that includes movement that satisfies a threshold distance. In response, computing device 101 may delete one or more characters included in text display region 100, such as one or more characters that form a word, one or more characters included in a line of text, one or more characters included in a sentence of text, or one or more characters included in a paragraph of text included in text display region 100. Similarly, as illustrated by GUI 108B of FIG. 1, when gesture module 107 determines that a distance of UI device 103 traversed by a gesture does not satisfy the threshold distance (e.g., a distance from first location 112A to third location 112C), gesture module 107 may not cause UI module 105 to delete any of the characters included in text display region 100.

In such a way, computing device 101 may enable a user to provide gesture input that satisfies a threshold distance to accurately delete one or more characters included in text display region 100. In addition, computing device 101 may output both a graphical indicator of the threshold distance that is satisfiable by gesture input and a visual change of the graphical indicator to indicate a portion of the gesture that remains to satisfy the threshold distance, thereby increasing the ease and accuracy with which the user may provide such gesture input to delete the one or more characters. In this way, computing device 101 may promote usability by facilitating user inputs to accurately and efficiently delete one or more characters of text. Moreover, a computing device implementing techniques of this disclosure may enable a user to provide gesture input to delete one character at a time, such as by repeatedly tapping a delete key, backspace key, etc. of a graphical keyboard, thereby preserving traditional delete functions of a graphical keyboard.

Figure 2:
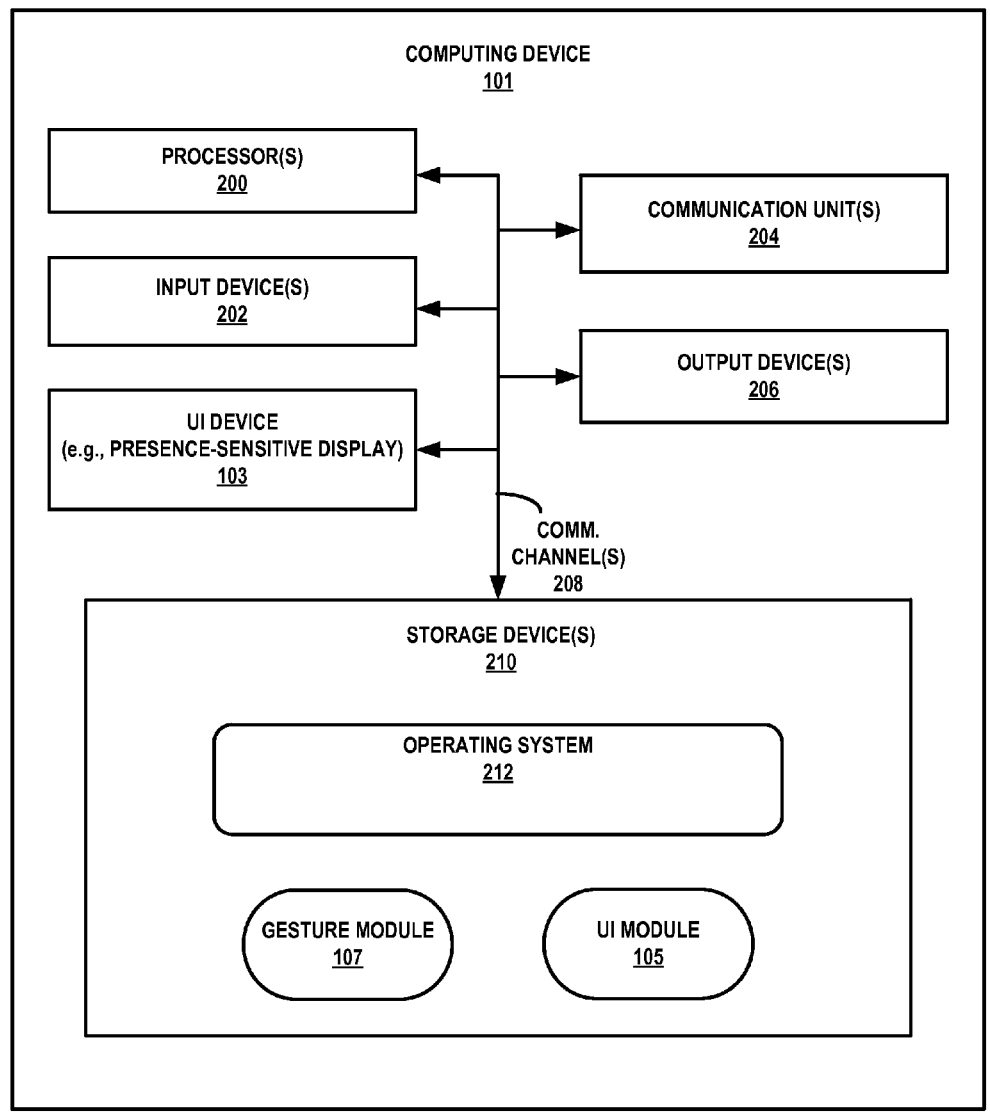
FIG. 2 is a block diagram illustrating further details of one example of a computing device shown in FIG. 1, in accordance with one or more aspects of the present disclosure.

FIG. 2 is a block diagram illustrating further details of one example of a computing device shown in FIG. 1, in accordance with one or more aspects of this disclosure. FIG. 2 illustrates only one particular example of computing device 101, and many other examples of computing device 101 may be used in other instances.

As shown in the specific example of FIG. 2, computing device 101 includes UI device 103, one or more processors 200, one or more input devices 202, one or more communication units 204, one or more output devices 206, and one or more storage devices 210. As illustrated, computing device 101 further includes gesture module 107, UI module 105, and operating system 212 that are executable by computing device 101. Each of components 4, 200, 202, 204, 206, and 210 may be interconnected (physically, communicatively, and/or operatively) for inter-component communications. In some examples, communication channels 208 may include a system bus, network connection, inter-process communication data structure, or any other channel for communicating data. As one example in FIG. 2, components 4, 200, 202, 204, 206, and 210 may be coupled by one or more communication channels 208. Gesture module 107, UI module 105 and operating system 212 may also communicate information with one another as well as with other components of computing device 101.

One or more processors 200, in one example, are configured to implement functionality and/or process instructions for execution within computing device 101. For example, one or more processors 200 may be capable of processing instructions stored at one or more storage devices 210. Examples of one or more processors 200 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 210 may be configured to store information within computing device 101 during operation. One or more storage devices 210, in some examples, may be described as a computer-readable storage medium. In some examples, one or more storage devices 210 may be a temporary memory, meaning that a primary purpose of one or more storage devices 210 is not long-term storage. One or more storage devices 210, in some examples, may be described as a volatile memory, meaning that one or more storage devices 210 do not maintain stored contents when the computer is turned off. Examples of volatile memories include random access memories (RAM), dynamic random access memories (DRAM), static random access memories (SRAM), and other forms of volatile memories known in the art. In some examples, one or more storage devices 210 may be used to store program instructions for execution by one or more processors 200. One or more storage devices 210, for example, may be used by software or applications running on computing device 101 (e.g., gesture module 107) to temporarily store information during program execution.

One or more storage devices 210, in some examples, also include one or more computer-readable storage media. One or more storage devices 210 may be configured to store larger amounts of information than volatile memory. One or more storage devices 210 may further be configured for long-term storage of information. In some examples, one or more storage devices 210 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In some examples, one or more storage devices 210 may store one or more instructions that cause one or more processors 200, gesture module 107, and UI module 105 to perform various functions ascribed to one or more processors 200, gesture module 107, and UI module 105. Although shown as separate components in FIG. 2, in some examples, one or more of gesture module 107 and UI module 105 may be part of the same module. In some examples, one or more of gesture module 107, UI module 105, and one or more processors 200 may be formed in a common hardware unit. In some instances, one or more of gesture module 107 and UI module 105 may be software and/or firmware units that are executed on one or more processors 200. In general, gesture module 107 and UI module 105 are presented separately for ease of description and illustration. However, such illustration and description should not be construed to imply that gesture module 107 and UI module 105 are necessarily separately implemented, but can be in some examples. Also, in certain examples, one or more processors 200 may include one or more of gesture module 107 and UI module 105.

Computing device 101, in some examples, also includes one or more communication units 204. Computing device 101, in one example, utilizes one or more communication units 204 to communicate with external devices via one or more networks, such as one or more wireless networks. One or more communication units 204 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 101 utilizes one or more communication units 204 to wirelessly communicate with an external device such as another computing device.

Computing device 101, in one example, also includes one or more input devices 202. One or more input devices 202, in some examples, may be configured to receive input from a user through tactile, audio, or video feedback. Examples of one or more input devices 202 include a presence-sensitive display, a mouse, a keyboard, a voice responsive system, video camera, microphone or any other type of device for detecting input from a user. In some examples, a presence-sensitive display includes a touch-sensitive screen.

One or more output devices 206 may be configured to provide output to a user using tactile, audio, or video stimuli. One or more output devices 206, for example, may include a presence-sensitive display, a touch-sensitive screen, a sound card, a video graphics adapter card, or any other type of device for converting a signal into an appropriate form understandable to humans or machines. Additional examples of one or more output devices 206 include a speaker, a cathode ray tube (CRT) monitor, a liquid crystal display (LCD), or any other type of device that can generate intelligible output to a user. In some examples, UI device 103 may include functionality of one or more input devices 202 and/or one or more output devices 206.

Computing device 101 may include operating system 212. Operating system 212, in some examples, controls the operation of components of computing device 101. For example, operating system 212, in one example, facilitates the communication of UI module 105 and gesture module 107 with one or more processors 200, UI device 103, one or more storage devices 210, one or more input devices 202, one or more output devices 206, and one or more communication units 204.

Gesture module 107 and UI module 105 may, in certain examples, include program instructions and/or data that are executable by computing device 101. As one example, UI module 105 may include instructions that cause computing device 101 to perform one or more of the operations and actions described in the present disclosure.

Techniques of the disclosure are now further described with respect to FIG. 2. In one example, UI module 105 may output for display at UI device 103 a text display region including one or more characters. For instance, UI module 105 may output the one or more characters "jumped" for display at text display region 100. Responsive to receiving an indication of an input unit detected at a first location of UI device 103 (e.g., first location 112A), UI module 105 may output, for display at UI device 103, a graphical indicator comprising a representation of a threshold distance. For instance, UI module 105 may output graphical indicator 106 including a representation of a threshold distance from first location 112A to second location 112B.

Gesture module 107 may receive an indication of a gesture (e.g., gesture 104) detected at UI device 103, the gesture including movement of the input unit from the first location of the presence-sensitive display (e.g., first location 112A) to a second location of the presence-sensitive display (e.g., second location 112B). Responsive to receiving the indication of the gesture, gesture module 107 may cause UI module 105 to output a visual change of the graphical indicator (e.g., graphical indicator 106) corresponding to the movement of the input unit from the first location to the second location. In some examples, UI module 105 may output the visual change of the graphical indicator substantially contemporaneously to receiving the indication of the gesture. For instance, gesture module 107 may cause UI module 105 to output the visual change of the graphical indicator within a threshold time of receiving the indication of gesture 104, such as within one millisecond, two milliseconds, fifty milliseconds, two hundred milliseconds, or other threshold amounts of time. As such, UI module 105 may output the visual change of the graphical indicator substantially contemporaneously to receiving the indication of the gesture, such that the visual change may appear to a user to visually track a movement of the gesture from the first location to the second location.

Gesture module 107 may determine that a distance between the first location and the second location satisfies the threshold distance. For instance, gesture module 107 may determine that a distance between first location 112A and second location 112B traversed by gesture 104 satisfies the threshold distance. In response to determining that the threshold distance is satisfied, UI module 105 may delete the one or more characters from the text display region (e.g., the characters "jumped" in this example).

Figure 3:
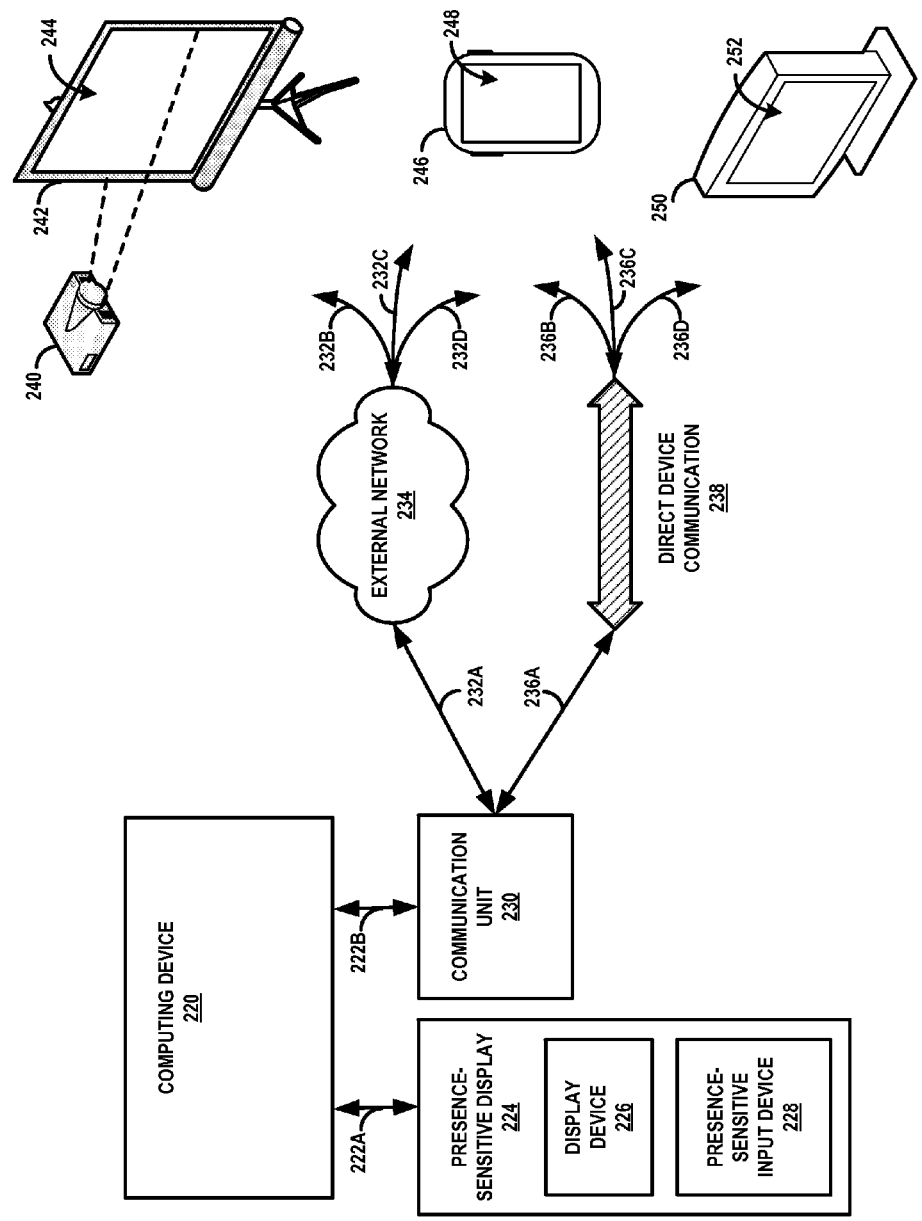
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 220, presence-sensitive display 224, communication unit 230, projector 240, projector screen 242, mobile device 246, and visual display device 250. Although shown for purposes of example in FIGS. 1 and 2 as a stand-alone computing device 101, a computing device such as computing device 220 may, generally, be any component or system that includes a processor or other suitable computing environment for executing software instructions and, for example, need not include a presence-sensitive display.

As shown in the example of FIG. 3, computing device 220 may be a processor that includes functionality as described with respect to processor 200 in FIG. 2. In such examples, computing device 220 may be operatively coupled to presence-sensitive display 224 by a communication channel 222A, which may be a system bus or other suitable connection. Computing device 220 may also be operatively coupled to communication unit 230, further described below, by a communication channel 222B, which may also be a system bus or other suitable connection. Although shown separately as an example in FIG. 3, computing device 220 may be operatively coupled to presence-sensitive display 224 and communication unit 230 by any number of one or more communication channels.

In other examples, such as illustrated previously by computing device 101 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 224, like UI device 103 as shown in FIG. 1, may include display device 226 and presence-sensitive input device 228. Display device 226 may, for example, receive data from computing device 220 and display the graphical content. In some examples, presence-sensitive input device 228 may determine one or more user inputs (e.g., continuous gestures, multi-touch gestures, single-touch gestures, etc.) at presence-sensitive display 224 using capacitive, inductive, and/or optical recognition techniques and send indications of such user input to computing device 220 using communication channel 222A. In some examples, presence-sensitive input device 228 may be physically positioned on top of display device 226 such that, when a user positions an input unit over a graphical element displayed by display device 226, the location at which presence-sensitive input device 228 corresponds to the location of display device 226 at which the graphical element is displayed. In other examples, presence-sensitive input device 228 may be positioned physically apart from display device 226, and locations of presence-sensitive input device 228 may correspond to locations of display device 226, such that input can be made at presence-sensitive input device 228 for interacting with graphical elements displayed at corresponding locations of display device 226.

As shown in FIG. 3, computing device 220 may also include and/or be operatively coupled with communication unit 230. Communication unit 230 may include functionality of communication unit 204 as described in FIG. 2. Examples of communication unit 230 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 220 may also include and/or be operatively coupled with one or more other devices, e.g., input devices, output devices, memory, storage devices, etc. that are not shown in FIG. 3 for purposes of brevity and illustration.

FIG. 3 also illustrates a projector 240 and projector screen 242. Other such examples of projection devices may include electronic whiteboards, holographic display devices, and any other suitable devices for displaying graphical content. Projector 240 and projector screen 242 may include one or more communication units that enable the respective devices to communicate with computing device 220. In some examples, the one or more communication units may enable communication between projector 240 and projector screen 242. Projector 240 may receive data from computing device 220 that includes graphical content. Projector 240, in response to receiving the data, may project the graphical content onto projector screen 242. In some examples, projector 240 may determine one or more user inputs (e.g., continuous gestures, multi-touch gestures, single-touch gestures, etc.) at projector screen using optical recognition or other suitable techniques and send indications of such user input using one or more communication units to computing device 220. In such examples, projector screen 242 may be unnecessary, and projector 240 may project graphical content on any suitable medium and detect one or more user inputs using optical recognition or other such suitable techniques.

Projector screen 242, in some examples, may include a presence-sensitive display 244. Presence-sensitive display 244 may include a subset of functionality or all of the functionality of UI device 103 as described in this disclosure. In some examples, presence-sensitive display 244 may include additional functionality. Projector screen 242 (e.g., an electronic whiteboard), may receive data from computing device 220 and display the graphical content. In some examples, presence-sensitive display 244 may determine one or more user inputs (e.g., continuous gestures, multi-touch gestures, single-touch gestures, etc.) at projector screen 242 using capacitive, inductive, and/or optical recognition techniques and send indications of such user input using one or more communication units to computing device 220.

FIG. 3 also illustrates mobile device 246 and visual display device 250. Mobile device 246 and visual display device 250 may each include computing and connectivity capabilities. Examples of mobile device 246 may include e-reader devices, convertible notebook devices, hybrid slate devices, etc. Examples of visual display device 250 may include other semi-stationary devices such as televisions, computer monitors, etc. As shown in FIG. 3, mobile device 246 may include a presence-sensitive display 248. Visual display device 250 may include a presence-sensitive display 252. Presence-sensitive displays 248, 252 may include a subset of functionality or all of the functionality of UI device 101 as described in this disclosure. In some examples, presence-sensitive displays 248, 252 may include additional functionality. In any case, presence-sensitive display 252, for example, may receive data from computing device 220 and display the graphical content. In some examples, presence-sensitive display 252 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 220.

As described above, in some examples, computing device 220 may output graphical content for display at presence-sensitive display 224 that is coupled to computing device 220 by a system bus or other suitable communication channel.

Computing device 220 may also output graphical content for display at one or more remote devices, such as projector 240, projector screen 242, mobile device 246, and visual display device 250. For instance, computing device 220 may execute one or more instructions to generate and/or modify graphical content in accordance with techniques of the present disclosure. Computing device 220 may output the data that includes the graphical content to a communication unit of computing device 220, such as communication unit 230. Communication unit 230 may send the data to one or more of the remote devices, such as projector 240, projector screen 242, mobile device 246, and/or visual display device 250. In this way, computing device 220 may output the graphical content for display at one or more of the remote devices. In some examples, one or more of the remote devices may output the graphical content at a presence-sensitive display that is included in and/or operatively coupled to the respective remote devices.

In some examples, computing device 220 may not output graphical content at presence-sensitive display 224 that is operatively coupled to computing device 220. In other examples, computing device 220 may output graphical content for display at both a presence-sensitive display 224 that is coupled to computing device 220 by communication channel 222A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 220 and output for display at presence-sensitive display 224 may be different than graphical content display output for display at one or more remote devices.

Computing device 220 may send and receive data using any suitable communication techniques. For example, computing device 220 may be operatively coupled to external network 234 using network link 232A. Each of the remote devices illustrated in FIG. 3 may be operatively coupled to network external network 234 by one of respective network links 232B, 232C, and 232D. External network 234 may include network hubs, network switches, network routers, etc., that are operatively inter-coupled thereby providing for the exchange of information between computing device 220 and the remote devices illustrated in FIG. 3. In some examples, network links 232A-232D may be Ethernet, ATM or other network connections. Such connections may be wireless and/or wired connections.

In some examples, computing device 220 may be operatively coupled to one or more of the remote devices included in FIG. 3 using direct device communication 238. Direct device communication 238 may include communications through which computing device 220 sends and receives data directly with a remote device, using wired or wireless communication. That is, in some examples of direct device communication 238, data sent by computing device 220 may not be forwarded by one or more additional devices before being received at the remote device, and vice-versa. Examples of direct device communication 238 may include Bluetooth, Near-Field Communication, Universal Serial Bus, WiFi, infrared, etc. One or more of the remote devices illustrated in FIG. 3 may be operatively coupled with computing device 220 by communication links 236A-236D. In some examples, communication links 236A-236D may be connections using Bluetooth, Near-Field Communication, Universal Serial Bus, infrared, etc. Such connections may be wireless and/or wired connections.

In accordance with techniques of the disclosure, computing device 220 may be operatively coupled to visual display device 250 using external network 234. Computing device 220 may output a text display region including one or more characters for display at presence-sensitive display 252. For instance, computing device 220 may send data that includes a representation of the text display region including the one or more characters to communication unit 230. Communication unit 230 may send the data that includes the representation of the text display region including the one or more characters to visual display device 250 using external network 234. Visual display device 250, in response to receiving the data using external network 234, may cause presence-sensitive display 252 to output the text display region including the one or more characters.

In response to detecting an input unit at a first location of presence-sensitive display 252 (e.g., at a region of presence-sensitive display 252 associated with a delete key of a graphical keyboard), visual display device 250 may send an indication of the detected input unit to computing device 220 using external network 234. For example, visual display device 250 may send an indication of a location of presence-sensitive display 252 that detects the input unit to computing device 220 using communication external network 234. Communication unit 230 of may receive the indication of the input unit detected at the first location of presence-sensitive display 252, and send the indication to computing device 220. In response to receiving the indication of the input unit detected at the first location of presence-sensitive display 252, computing device 220 may output a graphical indicator including a representation of a threshold distance. For example, computing device 220 may send data representing the graphical indicator to communication unit 230. Communication unit 230 may send the data to visual display device 250 via external network 234. Visual display device 250 may cause presence-sensitive display 252 to output the graphical indicator represented by the data.

Similarly, presence-sensitive display 252 may detect a gesture including movement of the input unit from the first location of presence-sensitive display 252 to a second location of presence-sensitive display 252. In response, visual display device 250 may send an indication of the gesture from the first location to the second location to computing device 220 using external network 234. Responsive to receiving the indication of the gesture, computing device 220 may output for display a visual change of the graphical indicator corresponding to the movement of the input unit from the first location to the second location of presence-sensitive display 252. For instance, computing device 220 may send data representing the visual change of the graphical indicator to visual display device 250 (e.g., via external network 224), which may cause presence-sensitive display 252 to output the visual change of the graphical indicator represented by the data.

Computing device 220 may determine that a distance between the first location of presence-sensitive display 252 and the second location of presence-sensitive display 252 satisfies the threshold distance. Computing device 220 may delete, in response to determining that the threshold distance is satisfied, the one or more characters from the text display region. For instance, computing device 220 may send data to visual display device 250 visa external network 224 which may cause presence-sensitive display 252 to cease to output the one or more characters at the text display region of presence-sensitive display 252.

Figure 4:
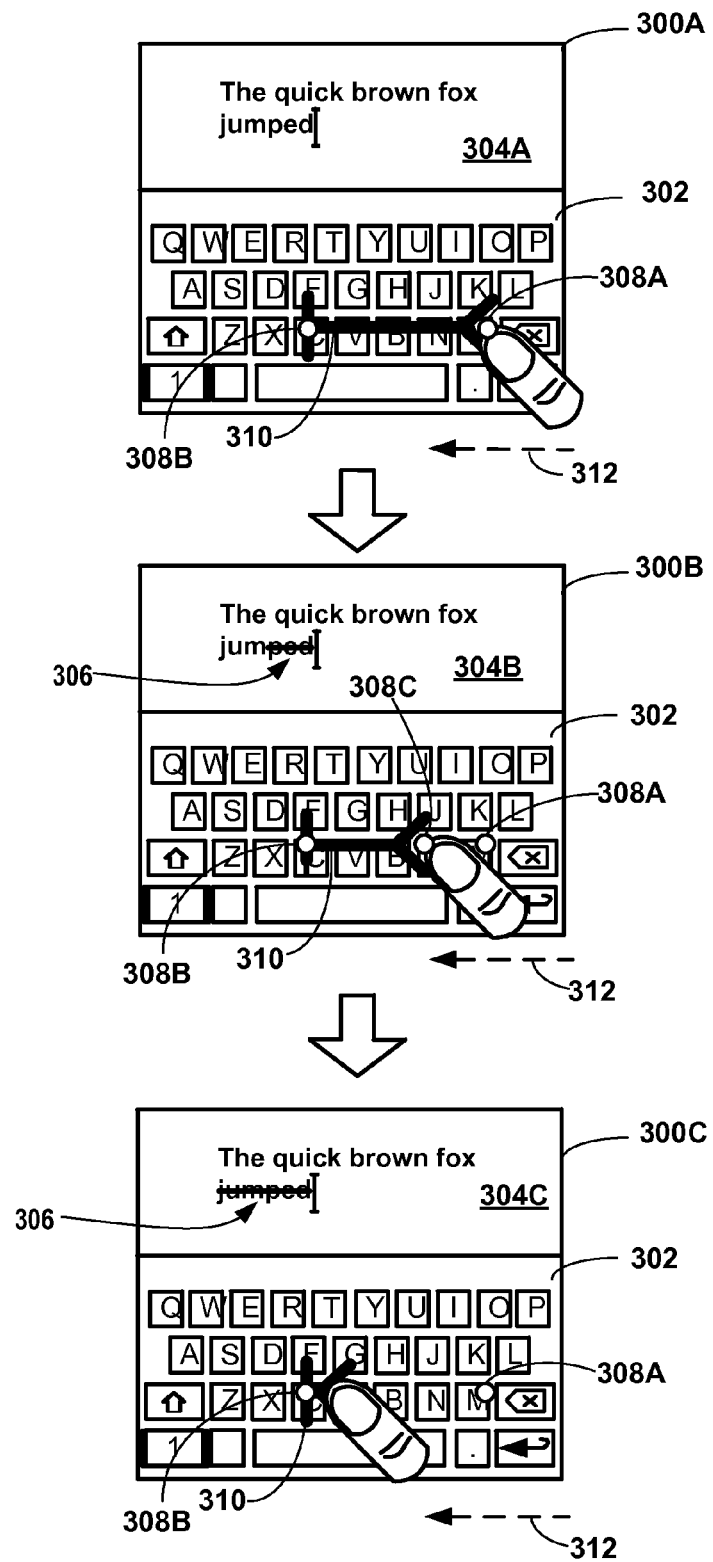
FIG. 4 is a conceptual diagram illustrating an example computing device that may display graphical content and delete one or more portions of the graphical content, in accordance with one or more techniques of the present disclosure.

FIG. 4 is a conceptual diagram illustrating an example computing device that may display graphical content and delete one or more portions of the graphical content, in accordance with one or more techniques of the present disclosure. For purposes of illustration only, the example of FIG. 4 is discussed with respect to computing device 101 of FIGS. 1-2.

In the example of FIG. 4, UI module 105 may generate GUIs 300A-300C (collectively referred to herein as "GUIs 300") for display at UI device 103 (e.g., a presence-sensitive display). GUIs 300 may include graphical keyboard 302, text display regions 304A-304C (collectively referred to herein as "text display region 304"), or other such display regions.

UI module 105 may output one or more characters for display at text display region 304, such as the illustrated characters "The quick brown fox jumped" included in text display region 304A. Gesture module 107 may receive an indication of an input unit detected at first location 308A of UI device 103. In response, UI module 105 may output graphical indicator 310 for display at UI device 103, graphical indicator 310 including a representation of a threshold distance. Gesture module 107 may receive an indication of gesture 312 detected at UI device 103, gesture 312 including movement of the input unit from first location 308A to second location 308B. In response to receiving the indication of gesture 312, gesture module 107 may cause UI module 105 to output a visual change of graphical indicator 310 corresponding to the movement of the input unit from first location 308A to second location 308B.

In some examples, UI module 105 may output a visual effect corresponding to the movement of the input unit, the visual effect indicating that one or more characters included in text display region 304 are selected for deletion. As one example, the visual effect may include a graphical strikethrough of the one or more characters to indicate that the one or more characters are selected for deletion, such as graphical strikethrough 306 illustrated in FIG. 4. In some examples, the visual effect may include highlighting, underlining, or otherwise indicating that the one or more characters are selected for deletion. For instance, in certain examples, UI module 105 may output the visual effect as a highlighting, graying, or other visual indication of a region of text display region 304 that displays the one or more characters that are selected for deletion. In some examples, UI module 105 may output the visual effect as a change in a color or intensity of the one or more characters that are selected for deletion. In general, UI module 105 may output the visual effect as any visual indication that distinguishes the one or more characters that are selected for deletion from one or more characters that are not selected for deletion. In certain examples, UI module 105 may output the visual effect substantially contemporaneously to receiving the indication of the gesture including movement of the input unit. For instance, UI module 105 may output the visual effect within a threshold time (e.g., one millisecond, two milliseconds, fifty milliseconds, two hundred milliseconds, or other amounts of time) of receiving an indication of one or more portions of the gesture.

In the example of FIG. 4, UI module 105 outputs graphical strikethrough 306 to indicate that one or more characters are selected for deletion. Graphical strikethrough 306 may correspond to the movement of the input unit from first location 308A to second location 308B. For instance, as illustrated by GUI 300B of FIG. 4, gesture module 107 may receive an indication of the input unit detected at third location 308C as gesture 312 traverses UI device 103 from first location 308A to second location 308B. Gesture module 107 may select one or more characters for deletion based at least in part on the movement of the input unit from first location 308A to third location 308C.

For instance, as in the example of FIG. 4, gesture module 107 may determine that a threshold distance from first location 308A to second location 308B indicated by graphical indicator 310 represents a threshold distance. The threshold distance may represent a distance that is satisfiable by gesture input from first location 308A to second location 308B to delete a word included in text display region 300. In such an example, gesture module 107 may determine a distance from first location 308A to third location 308C traversed by gesture 312, and may compare the traversed distance to the threshold distance to determine a fractional distance of the threshold distance traversed by gesture 312. Gesture module 107 may select one or more characters for deletion based at least in part on the fractional distance. For instance, gesture module 107 may determine a fractional distance of the threshold distance traversed by gesture 312 as half of the threshold distance. In some examples, based at least in part on the determined fractional distance as half of the threshold distance, gesture module 107 may select for deletion half of the characters included in the word (i.e., a number of characters that is linearly proportional to the determined fractional distance). In certain examples, gesture module 107 may select for deletion a number of characters that is non-linearly proportional to the determined fractional distance. For instance, in some examples, gesture module 107 may determine the fractional distance traversed by gesture 312 as half of the threshold distance, and may select less than half of the characters included in the word. In other examples, gesture module 107 may determine that fractional distance traversed by gesture 312 as half of the threshold distance, and may select more than half of the characters included in the word.

In certain examples, gesture module 107 may determine that a threshold distance from first location 308A to second location 308B indicated by graphical indicator 310 represents a threshold distance that is satisfiable by gesture input from first location 308A to second location 308B to delete a line of text included in text display region 300. For example, the threshold distance may represent a distance that is satisfiable by gesture input to delete the line of text including the characters "jumped" or the line of text including the characters "The quick brown fox" illustrated in the example of FIG. 4. In such examples, gesture module 107 may select for deletion one or more characters included in a line of text based at least in part on the determined fractional distance. For instance, gesture module 107 may determine that a gesture including movement from first location 308A to second location 308B satisfies the threshold distance. In response, gesture module 107 may select the characters included in a line of text for deletion, such as the line of text including the characters "jumped" or the line of text including the characters "The quick brown fox".

In certain examples, gesture module 107 may receive an indication of a second gesture detected at UI device 103, and may determine whether the threshold distance represents a threshold distance that is satisfiable by gesture input to delete a word of text or a line of text based at least in part on the second gesture. As an example, gesture module 107 may receive an indication of a second input unit detected at a third location of UI device 103. In certain examples, in response to receiving the indication of the second input unit detected at the third location, gesture module 107 may cause UI module 105 to output a selection indicator (e.g., a graphical overlay output at GUIs 300, such as a graphical overlay output at graphical keyboard 302). In some examples, the selection indicator may output a graphical representation of a motion of the second input unit to select either a word-deletion or line-deletion mode. For instance, the selection indicator may output a graphical representation of a motion of the second input unit in a vertical orientation with respect to an orientation of graphical keyboard 302 to select one of a word-deletion and a line-deletion mode, such as a motion of the second input unit in a direction toward text display region 304 to select a word-deletion mode and a motion of the second input unit in a direction away from text display region 304 to select a line-deletion mode.

In some examples, gesture module 107 may receive an indication of a second gesture including movement of the second input unit from the third location to a fourth location of UI device 103 to select a word-deletion mode. In response, gesture module 107 may select one or more characters of a word for deletion based at least in part on the determined fractional distance. Similarly, gesture module 107 may receive an indication of a second gesture including movement of the second input unit from the third location to a fourth location of UI device 103 to select a line-deletion mode. In response, gesture module 107 may select one or more characters of a line of text for deletion based at least in part on the determined fractional distance. In some examples, in response to detecting an indication of the second input unit at the third location, gesture module 107 may select the word-deletion mode. In certain examples, in response to detecting an indication of the second input unit at the third location, gesture module 107 may select the line-deletion mode. For instance, in certain examples, rather than receiving an indication of a motion of the second input unit to select one of the word-deletion and line-deletion modes, gesture module 107 may toggle between the word-deletion and line-deletion modes in response to receiving the indication of the second input unit detected at the third location.

As illustrated in the example of GUI 300B of FIG. 4, UI module 105 may output graphical strikethrough 306, corresponding to the movement of the input unit from first location 308A to third location 308C, to indicate that the one or more characters "ped" of the word "jumped" included in text display region 304B are selected for deletion. Similarly, as illustrated in the example of GUI 300C, UI module 105 may output graphical strikethrough 306, corresponding to the movement of the input unit from first location 308A to second location 308B (e.g., gesture 312 traversing UI device 103 from first location 308A through third location 308C to second location 308B), to indicate that the one or more characters "jumped" are selected for deletion.

Figure 5:
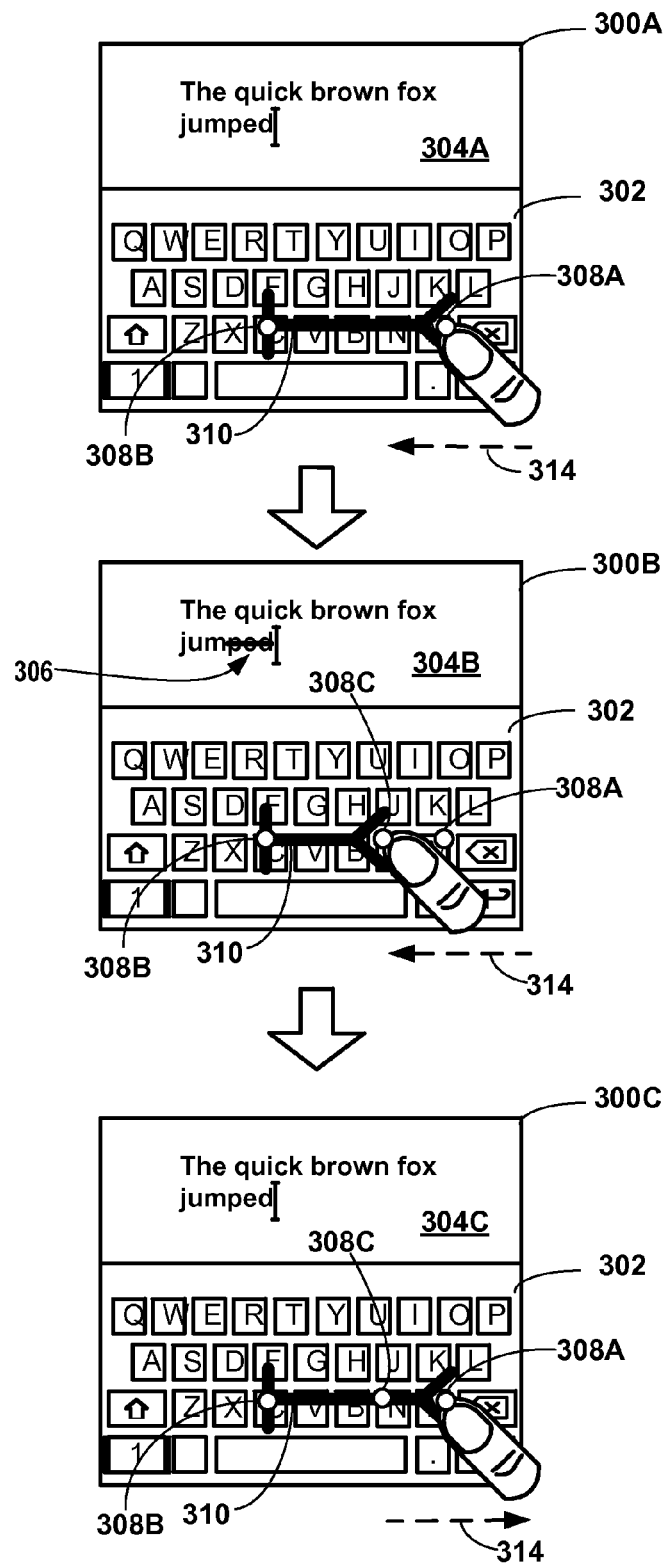
FIG. 5 is a conceptual diagram illustrating an example computing device that may display graphical content and delete one or more portions of the graphical content, in accordance with one or more techniques of the present disclosure.

FIG. 5 is a conceptual diagram illustrating an example computing device that may display graphical content and delete one or more portions of the graphical content, in accordance with one or more techniques of the present disclosure. For purposes of illustration only, the example of FIG. 5 is discussed with respect to computing device 101 of FIGS. 1-2. FIG. 5 illustrates an example in which computing device 101 may receive an indication of a gesture detected at UI device 103, and in response may remove the visual effect indicating that one or more characters are selected for deletion from at least a portion of the one or more characters to indicate that the portion of the one or more characters is deselected for deletion. In this way, the user can precisely view which characters will be deleted before the deletion takes effect.

In the example of FIG. 5, gesture module 107 may receive an indication of an input unit detected at first location 308A of UI device 103. In response, gesture module 107 may cause UI module 105 to output graphical indicator 310 for display at UI device 103, graphical indicator 310 including a representation of a threshold distance. As illustrated, graphical indicator 310 may extend from first location 308A to second location 308B to indicate a threshold distance (e.g., a distance between first location 308A and second location 308B) that is satisfiable by gesture input to delete one or more characters included in text display region 304 (e.g., one or more characters included in a word, such as the illustrated word "jumped").

Gesture module 107 may receive an indication of gesture 314 detected at UI device 103. As in the example of FIG. 5, gesture 314 may include a first portion and a second portion. For example, the first portion may include movement of the input unit from first location 308A to third location 308C. Third location 308C, as illustrated, may be positioned between first location 308A and second location 308B. In response to receiving the indication of the first portion of gesture 314 from first location 308A to third location 308C, gesture module 107 may cause UI module 105 to output a visual effect (e.g., graphical strikethrough 306) to indicate that one or more characters are selected for deletion, such as the one or more characters "ped" of the word "jumped" as illustrated by GUI 300B of FIG. 5.

In some examples, gesture 314 may include a second portion that includes movement of the input unit from third location 308C towards first location 308A. In response to receiving the indication of the second portion of gesture 314 from third location 308C towards first location 308A, gesture module 107 may cause UI module 105 to remove the visual effect from at least a portion of the one or more characters to indicate that the portion of the one or more characters is deselected for deletion. For instance, as illustrated by GUI 300C of FIG. 5, UI module 105 may remove graphical strikethrough 306 (e.g., cease to display graphical strikethrough 306) from the one or more characters "ped" of the word "jumped" included in text display region 304C to indicate that the one or more characters "ped" are deselected for deletion. In such a way, UI module 105 may provide a visual indication of those characters that are selected for deletion. That is, in examples where none of the characters are overlaid with graphical strikethrough 306, UI module 105 may not delete any of the characters. In other examples, those characters that are overlaid with graphical strikethrough 306 may be deleted, and those characters that are not overlaid with graphical strikethrough 306 may not be deleted.

As similarly discussed above, while the visual effect indicating that the one or more characters are selected for deletion is illustrated with respect to the example of FIG. 5 as a graphical strikethrough (e.g., graphical strikethrough 306), aspects of this disclosure are not so limited. For instance, in some examples, UI module 105 may output the visual effect as a highlighting of the one or more characters selected for deletion, a graying of the one or more characters selected for deletion, a change in the color and/or intensity of the one or more characters selected for deletion, and the like.

As one example, UI module 105 may output the visual effect as a change in color of one or more characters selected for deletion and/or a region of text display region 304 that displays the one or more characters selected for deletion, such as a change in color from a black color indicating that a character is not selected for deletion to a grey color indicating that the character is selected for deletion. In such an example, UI module 105 may receive an indication that an input unit used to provide the gesture to select the one or more characters for deletion (e.g., a finger, pen, stylus, and the like) is no longer detected by the presence-sensitive input device (e.g., UI device 103). In response, UI module 105 may delete the one or more characters that are selected for deletion from text display region 304.

In certain examples, UI module 105 may output a selectable graphical element, such as a graphical button, to enable a user to "undo" deletion of the one or more selected characters by indicating (e.g., tapping) the graphical element. For instance, in response to receiving an indication of a selection of the graphical element, UI module 105 may output, for display at text display region 304, the one or more characters that were deleted by a gesture, thereby effectively reversing the delete operation with respect to the selected one or more characters. In some examples, UI module 105 may output the graphical element for display within GUIs 300, such as at a region of GUIs 300 that includes text display region 304, a region of GUIs 300 that includes graphical keyboard 302, or other regions of GUIs 300, such as a text suggestion region of GUIs 300 (not illustrated). In certain examples, UI module 5 may output the graphical element for a threshold amount of time subsequent to deleting the one or more selected characters, such as one second, five seconds, ten seconds, thirty seconds, or other threshold amounts of time. In such examples, UI module 5 may remove the graphical element when the threshold amount of time is satisfied (e.g., at a time that is greater than or equal to the threshold amount of time). For instance, in response to determining that the threshold amount of time is satisfied, UI module 5 may refrain from outputting the graphical element for display at GUIs 300, thereby causing the graphical element to cease to be included (e.g., displayed) in GUIs 300.

In certain examples, UI module 5 may output the graphical element for display in GUIs 300 until UI module 5 receives an indication of a subsequent selection of at least one key included in graphical keyboard 302. For instance, in response to receiving an indication that an input unit used to provide a gesture to delete the one or more characters, UI module 5 may output the graphical element (e.g., a graphical button) to enable the user to "undo" the deletion of the one or more characters. In response to receiving an indication of gesture input to select one or more keys of graphical keyboard 302, UI module 5 may remove the graphical element from GUIs 300 (i.e., cease to output the graphical element for display within GUIs 300).

As such, according to various techniques of this disclosure, computing device 101 may enable a user to provide gesture input that satisfies a threshold to delete one or more characters output for display within a text display region of a display device, such as a presence-sensitive display. In addition, techniques described herein may enable a user to provide gesture input to deselect the one or more characters for deletion (e.g., "undo" a deletion), thereby possibly enabling more accurate deletion of the one or more characters included in the text display region.

Figure 6:
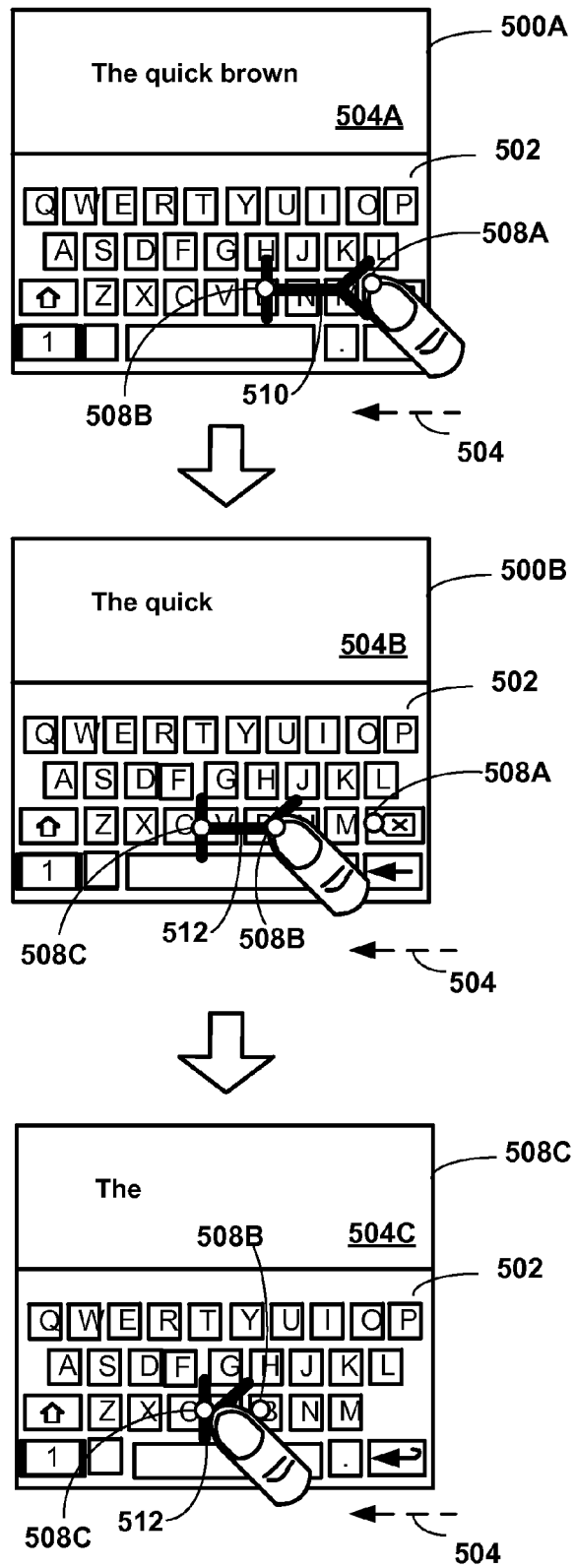
FIG. 6 is a conceptual diagram illustrating an example computing device that may display graphical content and delete one or more portions of the graphical content, in accordance with one or more techniques of the present disclosure.

FIG. 6 is a conceptual diagram illustrating an example computing device that may display graphical content and delete one or more portions of the graphical content, in accordance with one or more techniques of the present disclosure. For purposes of illustration only, the example of FIG. 6 is discussed with respect to computing device 101 of FIGS. 1-2.

As illustrated in the example of FIG. 6, in response to receiving a first portion of a gesture that satisfies a first threshold distance to delete one or more characters included in a text display region, computing device 101 may output a second graphical indicator including a representation of a second threshold distance. In response to receiving an indication of a second portion of the gesture that satisfies the second threshold distance, computing device 101 may delete one or more additional characters included in the text display region.

As illustrated by GUI 500A of FIG. 6, UI module 105 may output for display at text display region 504A a plurality of characters, such as the illustrated plurality of characters "The quick brown". The plurality of characters may include at least a first portion and a second portion of the plurality of characters. For instance, the first portion of the plurality of characters may include the characters "brown", and the second portion may include the characters "quick". Gesture module 107 may receive an indication of a first portion of a gesture that satisfies a first threshold distance to delete the first portion of the plurality of characters (e.g., the characters "brown" in this example). In response to receiving the indication of the first portion of the gesture to delete the first portion of the plurality of characters, gesture module 107 may delete the first portion of the plurality of characters from the text display region. In addition, in response to receiving the indication of the first portion of the gesture that satisfies the first threshold distance, gesture module 107 may cause UI module 105 to output a second graphical indicator that includes a representation of a second threshold distance that is satisfiable by gesture input to delete the second portion of the plurality of characters (e.g., the characters "quick" in this example). In response to receiving an indication of a second portion of the gesture to delete the second portion of the plurality of characters, gesture module 107 may delete the second portion of the plurality of characters from the text display region.

In some examples, such as when the plurality of characters includes a third portion, gesture module 107 may cause UI module 105 to output a third graphical indicator that includes a representation of a third threshold distance that is satisfiable by gesture input to delete the third portion of the plurality of characters. In certain examples, gesture module 107 may continue to cause UI module 105 to output such graphical indicators including representations of respective threshold distances to delete one or more characters included in the text display region, thereby enabling a user to provide gesture input including one or more portions of the gesture to delete the respective portions of the plurality of characters included in the text display region. In such a way, computing device 101 may enable a user to provide gesture input that satisfies the threshold distance to delete one or more characters, thereby enabling the user to precisely and accurately delete one or more characters included in the text display region.

For example, as illustrated in FIG. 6, gesture module 107 may receive an indication of an input unit detected at first location 508A of UI device 103 (e.g., a location associated with a delete key, backspace key, or other selectable key of graphical keyboard 502 associated with a delete function to remove one or more characters included in text display region 504). In response to receiving the indication of the input unit detected at first location 508A, gesture module 107 may cause UI module 105 to output first graphical indicator 510. As illustrated, first graphical indicator 510 may include a representation of a first threshold distance, such as a first threshold distance from first location 508A to second location 508B of UI device 103 (e.g., a presence-sensitive display). The first threshold distance may represent a threshold distance that is satisfiable by gesture input that traverses UI device 103 to delete a first portion of a plurality of characters included in text display region 500, such as a first portion including the characters "brown" of the plurality of characters "The quick brown".

Gesture module 107 may receive an indication of a first portion of gesture 504, the first portion of gesture 504 including movement of the input unit from first location 508A to second location 508B. In response to receiving the indication of the first portion of gesture 504, gesture module 107 may determine that the first threshold distance is satisfied. In response to determining that the first threshold distance is satisfied, gesture module 107 may cause UI module 105 to delete the first portion of the plurality of characters. For instance, as illustrated by GUI 500B of FIG. 6, gesture module 107 may cause UI module 105 to delete the first portion including the characters "brown" from the plurality of characters "The quick brown" included in text display region 504B.

In addition, in response to determining that the first threshold distance is satisfied, gesture module 107 may cause UI module 105 to output second graphical indicator 512. As illustrated, second graphical indicator 512 may include a representation of a second threshold distance, such as the second threshold distance of UI device 103 from second location 508B to third location 508C. Gesture module 107 may receive an indication of a second portion of gesture 504 from second location 508B to third location 508C. Gesture module 107 may determine that the second portion of gesture 504 satisfies the second threshold distance. In response to determining that the second portion of gesture 504 satisfies the second threshold distance, gesture module 107 may cause UI module 105 to delete the second portion of the plurality of characters from text display region 504. For instance, as illustrated by GUI 508C of FIG. 6, gesture module 107 may cause UI module 105 to delete the second portion including the characters "quick" from the plurality of characters "The quick brown".

Figure 7:
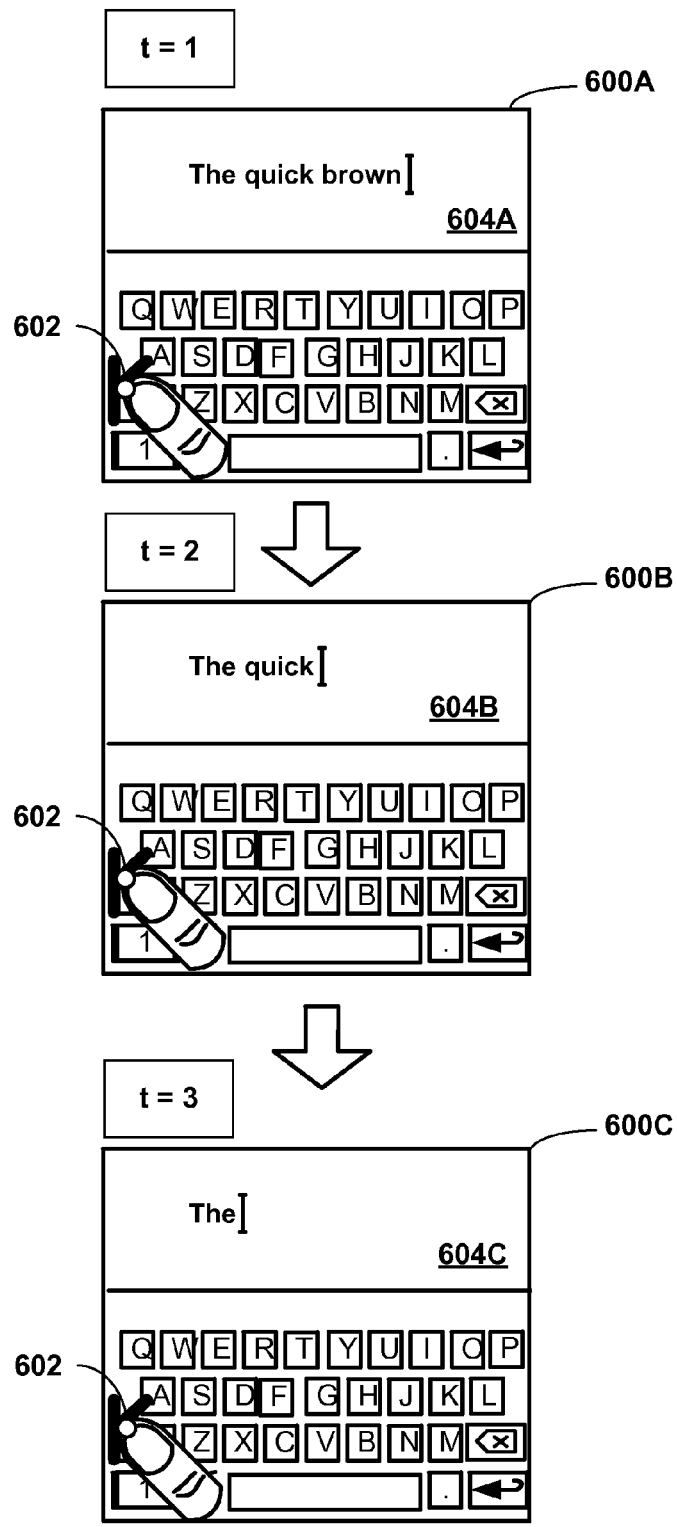
FIG. 7 is a conceptual diagram illustrating an example computing device that may display graphical content and delete one or more portions of the graphical content, in accordance with one or more techniques of the present disclosure.

FIG. 7 is a conceptual diagram illustrating an example computing device that may display graphical content and delete one or more portions of the graphical content, in accordance with one or more techniques of the present disclosure. For purposes of illustration only, the example of FIG. 7 is discussed with respect to computing device 101 of FIGS. 1-2.

As illustrated in the example of FIG. 7, UI module 105 may output for display a plurality of characters, such as the plurality of characters "The quick brown" included in text display region 604A of GUI 600A. The plurality of characters may include at least a first portion and a second portion, such as a first portion including the characters "brown" and a second portion including the characters "quick". As another example, the plurality of characters may include a third portion, such as the portion including the characters "The". In certain examples, the first portion may include a line of text, such as the line of text "The quick brown" and a second portion including a different line of text (not illustrated).

Gesture module 107 may receive an indication of an input unit detected at location 602 of UI device 103. In some examples, location 602 may be associated with a location of UI device 103 that satisfies a threshold distance of a gesture to delete one or more characters included in text display region 604.

Gesture module 107 may determine that the input unit is detected at location 602 for a threshold amount of time, such as for an amount of time that is greater than or equal to one half of one second, one second, two seconds, or other threshold amounts of time. In response to determining that the input unit is detected at location 602 for the threshold amount of time, gesture module 107 may cause UI module 105 to delete one or more portions of the plurality of characters included in the text display region.

For example, as illustrated in the example of FIG. 7, gesture module 107 may receive an indication of an input unit detected at location 602 of UI device 103 at a first time, such as the time denoted as "t=1" in the example of GUI 600A of FIG. 7, at which the plurality of characters "The quick brown" is output for display at text display region 604A. Gesture module 107 may receive an indication of the input unit detected at location 602 of UI device 103 at a second time, such as the time denoted as "t=2" in the example of GUI 600B. That is, gesture module 107 may receive an indication of substantially constant contact of the input unit at location 602 from the first time to the second time, such that the input unit is detected at location 602 from the first time to the second time without detecting the non-presence of the input unit. Gesture module 107 may determine a time difference from the first time to the second time. Gesture module 107 may compare the determined time difference to a threshold time. In response to determining that the determined time difference (e.g., one second, two seconds, or other amounts of time) satisfies a threshold amount of time (e.g., the time difference is greater than the threshold amount of time, the time difference is greater than or equal to the threshold amount of time, etc.), gesture module 107 may cause UI module 105 to delete one or more characters included in text display region 604.

For example, as illustrated by GUI 600B, gesture module 107 may determine that the time difference between the first time and the second time satisfies the threshold amount of time. For instance, gesture module 107 may determine that the time difference satisfies the threshold amount of time when the time difference is greater than the threshold amount of time. In other examples, gesture module 107 may determine that the time difference satisfies the threshold amount of time when the time difference is greater than or equal to the threshold amount of time. In yet other examples, gesture module 107 may determine that the time difference satisfies the threshold amount of time when the time difference is less than the threshold amount of time, less than or equal to the threshold amount of time, etc.

In response to determining that the time difference between the first time and the second time satisfies the threshold amount of time, gesture module 107 may cause UI module 105 to delete the first portion of the plurality of characters (e.g., the first portion including the characters "brown" in the illustrated example). Similarly, gesture module 107 may receive an indication of the input unit detected at location 602 at a third time, such as a third time denoted as "t=3" in the example of FIG. 7. Gesture module 107 may determine that a time difference between the second time and the third time satisfies a threshold amount of time (e.g., a same threshold amount of time or a different threshold amount of time). In response, gesture module 107 may cause UI module 105 to delete a second portion of the plurality of characters, such as the second portion including the characters "quick" of the plurality of characters "The quick brown". In such a way, computing device 101 may continue to delete one or more portions of a plurality of characters included in a text display region in response to receiving an indication of an input unit detected at a location of UI device 103 for an amount of time that satisfies one or more threshold amounts of time.

Figure 8:
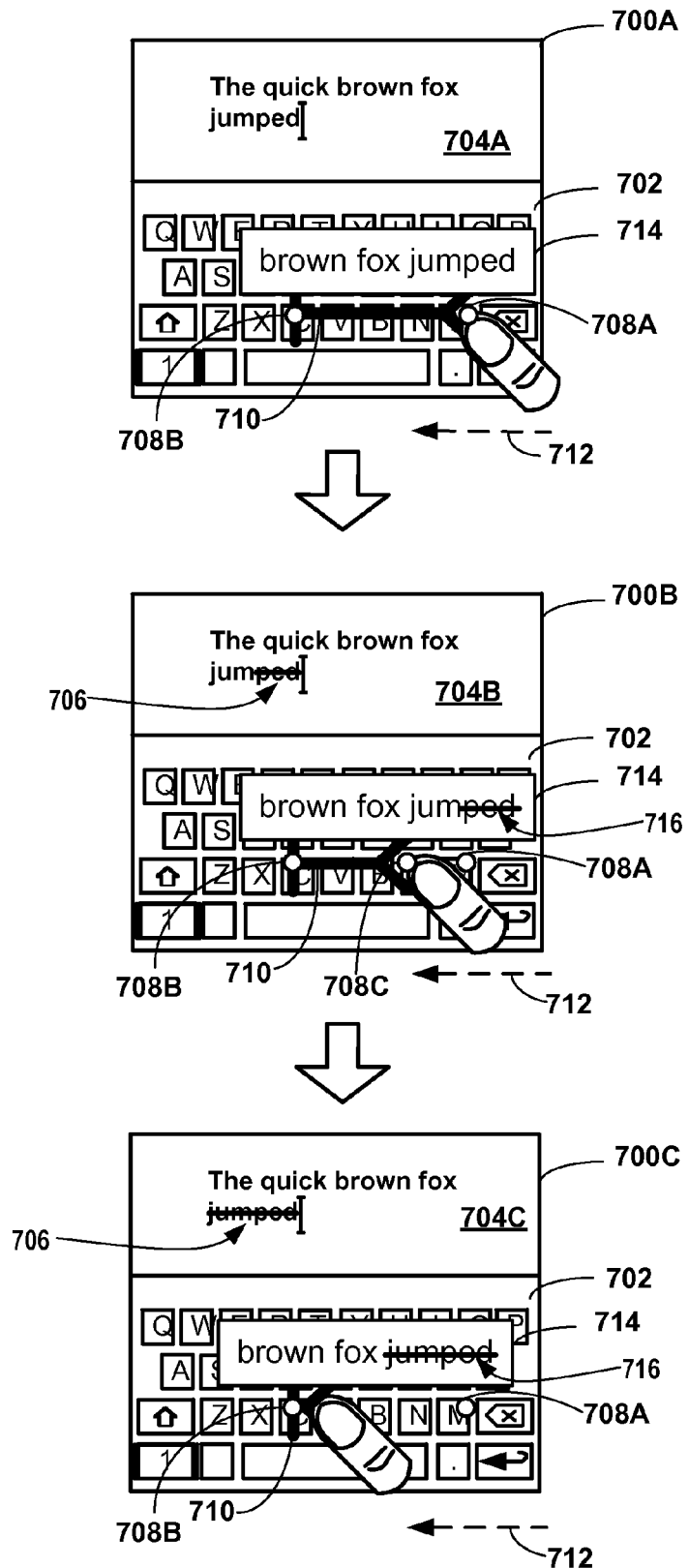
FIG. 8 is a conceptual diagram illustrating an example computing device that may display graphical content and delete one or more portions of the graphical content, in accordance with one or more techniques of the present disclosure.

FIG. 8 is a conceptual diagram illustrating an example computing device that may display graphical content and delete one or more portions of the graphical content, in accordance with one or more techniques of the present disclosure. For purposes of illustration only, the example of FIG. 8 is discussed with respect to computing device 101 of FIGS. 1-2.

As illustrated in FIG. 8, computing device 101 may output a plurality of characters for display at text display region 704, such as the illustrated plurality of characters "The quick brown fox jumped". Gesture module 107 may receive an indication of an input unit detected at first location 708A of UI device 103 (e.g., a location corresponding to a backspace key of graphical keyboard 702, a delete key, or other selectable icon associated with a delete function to remove one or more characters from text display region 704). In response to receiving the indication of the input unit detected at first location 708A, gesture module 107 may cause UI module 105 to output graphical indicator 710 including a representation of a threshold distance that is satisfiable by gesture input to delete one or more characters included in text display region 704.

As illustrated, graphical indicator 701 may extend from first location 708A to second location 708B. Gesture module 107 may receive an indication of gesture 712 detected at UI device 103, gesture 712 including movement of the input unit from first location 708A to second location 708B. Gesture module 107 may cause UI module 105 to output a visual change of graphical indicator 710 corresponding to the movement of the input unit from first location 708A to second location 708B. In addition, gesture module 107 may cause UI module 105 to output a visual effect, such as graphical strikethrough 706, corresponding to the movement of the input unit, the visual effect indicating that one or more characters are selected for deletion.

In some examples, such as the example of FIG. 8, in response to receiving the indication of the input unit detected at first location 708A of UI device 103, gesture module 107 may cause UI module 105 to output a text window including at least a portion of the plurality of characters included in text display region 704. For example, as illustrated by GUI 700A of FIG. 8, UI module 105 may output text window 714 including the portion of characters "brown fox jumped" of the plurality of characters "The quick brown fox jumped". In some examples, as in the example of FIG. 8, UI module 105 may output text window 714 as a graphical overlay of graphical keyboard 702, thereby possibly enabling a user to more easily view the one or more characters that may be selected for deletion without diverting his or her gaze from graphical indicator 710.

In certain examples, UI module 105 may output one or more characters for display at text window 714, the one or more characters including a different size font than the plurality of characters included in text display region 704. For instance, UI module 105 may output the one or more characters for display at text window 714 including a larger sized font than the plurality of characters included in text display region 704. In some examples, UI module 105 may output the one or more characters for display at text window 714, the one or more characters including a larger spacing between the one or more characters than a spacing between the plurality of characters included in text display region 704. In certain examples, UI module 105 may output the one or more characters for display at text window 714, the one or more characters including a spacing between each of the one or more characters that increases from a left side of text window 714 to a right side of text window 714 (e.g., a left side and a right side of text window 714 with respect to an orientation of text window 714, such as an orientation with respect to a user that views window 714).

Gesture module 107 may cause UI module 105 to output a visual effect for display at text window 714 corresponding to the movement of the input unit from first location 708A to second location 708B, the visual effect indicating that one or more characters are selected for deletion. For instance, as illustrated by GUI 700B of FIG. 8, UI module 105 may output graphical strikethrough 716 for display at text window 714 corresponding to the movement of the input unit from first location 708A to third location 708C to indicate that the characters "ped" of the word "jumped" are selected for deletion. Similarly, UI module 105 may output graphical strikethrough 706 for display at text display region 704B. As further illustrated by GUI 700C, in response to receiving an indication of gesture 712 from first location 708A to second location 708B (e.g., from first location 708A through third location 708C and to second location 708B), UI module 105 may output graphical strikethrough 716 for display at text window 716 and graphical strikethrough 706 for display at text display region 704C to indicate that the characters "jumped" are selected for deletion.

While in the example of FIG. 8, UI module 105 outputs both graphical strikethrough 706 and graphical strikethrough 716 for display at GUIs 700, aspects of this disclosure are not so limited. For instance, UI module 105 may output one or more of graphical strikethrough 706 and graphical strikethrough 716 for display at GUIs 700. That is, in certain examples, UI module 105 may output graphical strikethrough 706 but not graphical strikethrough 716. Similarly, in some examples, UI module 105 may output graphical strikethrough 716 but not graphical strikethrough 706. In certain examples, UI module 105 may output neither graphical strikethrough 706 nor graphical strikethrough 716 for display at GUIs 700.

In some examples, UI module 105 may output one or more of graphical strikethrough 706 and graphical strikethrough 716 based at least in part on the threshold distance that is satisfiable by gesture input to delete one or more characters included in text display region 704. For instance, in some examples, UI module 105 may output one or more of graphical strikethrough 706 and graphical strikethrough 716 as a first color (e.g., red) until the gesture module 107 determines that the threshold distance is satisfied. In such examples, UI module 105 may output one or more of graphical strikethrough 706 and graphical strikethrough 716 as a second color (e.g., black) in response to determining that the threshold distance is satisfied. In certain examples, UI module 105 may remove the visual effect indicating that one or more characters are selected for deletion (e.g., one or more of graphical strikethrough 706 and graphical strikethrough 716) in response to receiving an indication of a portion of gesture 712 including movement in a direction from second location 708B to first location 708A. In such a way, UI module 105 may output an indication of which of the one or more characters are selected for deletion and which of the one or more characters are deselected for deletion.

Figure 9:
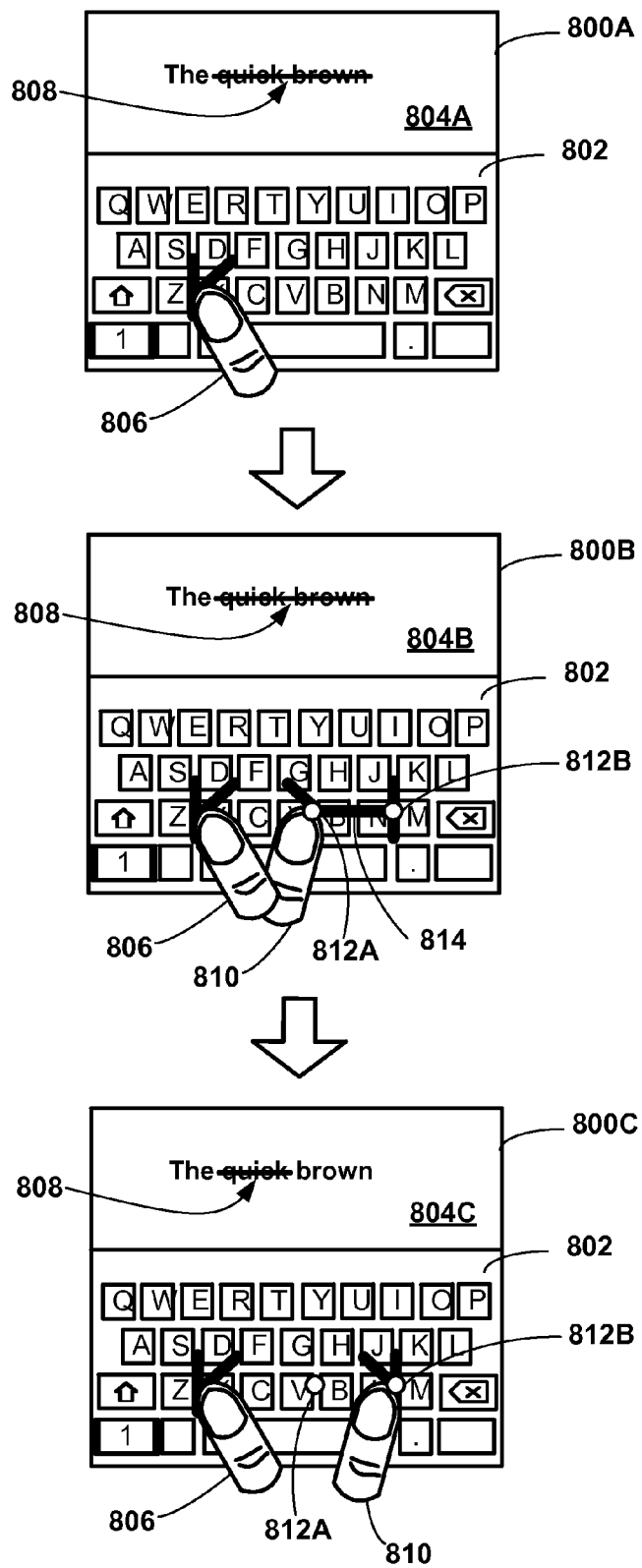
FIG. 9 is a conceptual diagram illustrating an example computing device that may display graphical content and delete one or more portions of the graphical content, in accordance with one or more techniques of the present disclosure.

FIG. 9 is a conceptual diagram illustrating an example computing device that may display graphical content and delete one or more portions of the graphical content, in accordance with one or more techniques of the present disclosure. For purposes of illustration only, the example of FIG. 9 is discussed with respect to computing device 101 of FIGS. 1-2.

As illustrated by GUI 800A of FIG. 9, UI module 105 may output for display at text display region 800A a plurality of characters, such as the illustrated plurality of characters "The quick brown". According to various techniques of this disclosure, gesture module 107 may receive an indication of one or more gestures to delete one or more of the plurality of characters included in text display region 800A. In response, gesture module 107 may cause UI module 105 to output a visual effect corresponding to a movement of the one or more gestures, the visual effect indicating that the one or more characters are selected for deletion. For instance, as illustrated, UI module 105 may output graphical strikethrough 808 at text display region 800A to indicate that the characters "quick brown" of the plurality of characters "The quick brown" are selected for deletion. That is, in the example of FIG. 9, GUI 800A represents an example where gesture module 107 has received an indication of one or more gestures detected at UI device 103 corresponding to movement of first input unit 806 to satisfy one or more threshold distances to delete the one or more characters "quick brown".

As illustrated by GUI 800B of FIG. 9, gesture module 107 may receive an indication of second input unit 810 (e.g., a second finger of a user) detected at location 812A of UI device 103. In certain examples, in response to receiving the indication of second input unit 810 detected at location 812A, UI module 105 may output graphical indicator 812A for display at GUI 800B, graphical indicator 812A including a representation of a threshold distance (e.g., a distance from location 812A to location 812B). In other examples, UI module 105 may not output graphical indicator 812A.

As illustrated by GUI 800C of FIG. 9, gesture module 107 may receive an indication of a gesture including movement of second input unit 810 from location 812A to location 812B. In certain examples, gesture module 107 may receive the indication of the gesture including movement of second input unit 810 while first input unit 806 is detected by UI device 103. In response to receiving the indication of the gesture including movement of second input unit 810 from location 812A to location 812B, gesture module 107 may cause UI module 105 to remove graphical strikethrough 808 (i.e., a visual effect indicating that one or more characters are selected for deletion) from at least a portion of the one or more characters included in text display region 804C. For instance, as illustrated, UI module 105 may remove the visual effect from the portion of the one or more characters including the characters "brown" to indicate that the characters "brown" are not selected for deletion. As such, gesture module 107 may cause UI module 105 to delete only those characters that are selected for deletion, such as the characters "quick" of the plurality of characters "The quick brown".

Figure 10:
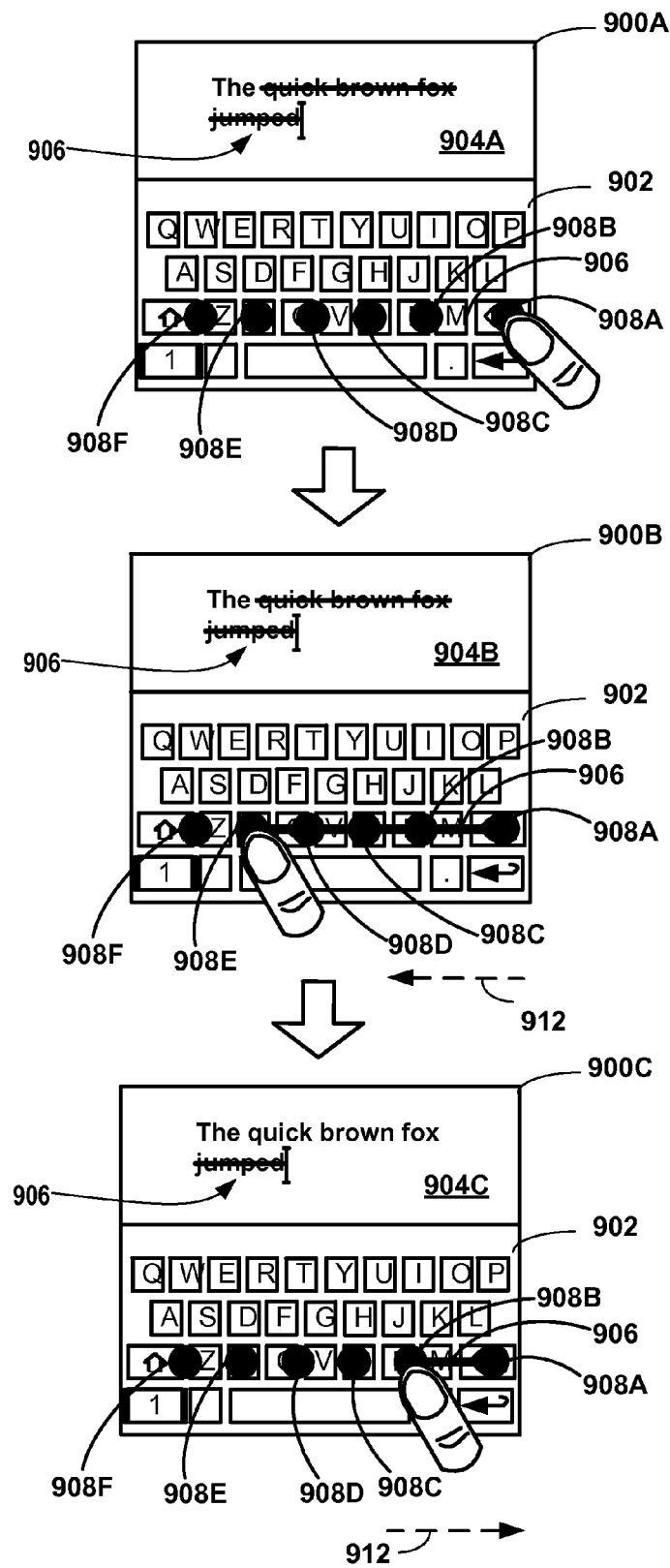
FIG. 10 is a conceptual diagram illustrating an example computing device that may display graphical content and delete one or more portions of the graphical content, in accordance with one or more techniques of the present disclosure.

FIG. 10 is a conceptual diagram illustrating an example computing device that may display graphical content and delete one or more portions of the graphical content, in accordance with one or more techniques of the present disclosure. For purposes of illustration only, the example of FIG. 10 is discussed with respect to computing device 101 of FIGS. 1-2. FIG. 10 illustrates an example in which computing device 101 may output a visual effect corresponding to the movement of the input unit, the visual effect indicating that one or more characters included in text display region 904 are selected for deletion. In addition, FIG. 10 illustrates an example in which computing device 101 may output one or more indications of threshold distances (e.g., graphical boundary indicators 908A-908F), the one or more threshold distances satisfiable by gesture input to delete one or more characters of text from text display regions 904.

As illustrated in FIG. 10, gesture module 107 may receive an indication of an input unit detected at first location 908A of UI device 103 (e.g., a location of UI device 103 associated with a backspace key of graphical keyboard 902). In response, gesture module 107 may cause UI module 105 to output, for display, one or more graphical boundary indicators. For instance, UI module 105 may output graphical boundary indicators 908A-908F (collectively referred to herein as "graphical boundary indicators 908") for display at GUIs 900. Each of graphical boundary indicators 908 may represent a threshold distance that is satisfiable by gesture input to delete one or more characters from text display regions 904. For instance, as in the example of FIG. 10, each of graphical boundary indicators 908 represents a threshold distance that is satisfiable by gesture input to delete a word of text from text display regions 904. That is, graphical indicator 908B represents a first threshold distance that is satisfiable by gesture input to delete a first word of text from text display regions 904 (e.g., a word that appears at the end of the line of text). Similarly, graphical indicator 906C represents a second threshold distance that is satisfiable by gesture input to delete both the first word of text and a second word of text from text display regions 904 (e.g., the last two words of the line of text). As illustrated, UI module 105 may output multiple graphical boundary indicators, such as two, three, five, or more graphical boundary indicators. In this way, UI module 105 may output one or more graphical indicators representing one or more threshold distances that are satisfiable by gesture input to delete one or more characters (e.g., words) of text included in text display regions 904.

Gesture module 107 may receive an indication of a gesture including movement of the input unit (e.g., finger) from first location 908A to a second location of UI device 103. For instance, as illustrated in FIG. 10, gesture module 107 may receive an indication of gesture 912 detected at UI device 103 including movement of the input unit from first location 908A to a second location of UI device 103 corresponding to graphical boundary indicator 908E. In some examples, in response to receiving the indication of the gesture including the movement of the input unit from the first location to the second location, UI module 105 may output a visual change of the graphical indicator corresponding to the movement of the input unit from the first location to the second location. For instance, as illustrated, UI module 105 may output graphical indicator 906 including a graphical line extending from first location 908A to the second location.

Gesture module 107 may determine that a distance between the first location and the second location satisfies a threshold distance. For instance, as illustrated, gesture module 107 may determine that a distance between first location 908A and the second location corresponding to graphical boundary indicator 908E satisfies a threshold distance to delete four words of text included in text display regions 904. That is, gesture module 107 may determine that the distance between first location 908A and the second location is greater than (or equal to) a distance between first location 908A and a location corresponding to graphical boundary indicator 908B to delete a first word of text. Similarly, gesture module 107 may determine that the distance between first location 908A and the second location is greater than (or equal to) each of the distances between first location 908A and locations corresponding to graphical boundary indicator 908C to delete a second word, graphical boundary indicator 908D to delete a third word, and 908E to delete a fourth word. In response to determining that the gesture input satisfies the one or more threshold distances, UI module 105 may output a visual effect (e.g., graphical strikethrough 906) to indicate that one or more characters (e.g., words) are selected for deletion, such as the one or more characters included in the words "quick brown fox jumped" as illustrated by GUI 900B of FIG. 10.

In some examples, gesture 912 may include a second portion that includes movement of the input unit from the second location in a direction towards first location 908A. In response to receiving the indication of the second portion of the gesture, gesture module 107 may cause UI module 105 to remove the visual effect from at least a portion of the one or more characters to indicate that the portion of the one or more characters is deselected for deletion. For instance, as illustrated by GUI 900C of FIG. 10, UI module 105 may remove graphical strikethrough 906 (e.g., cease to display graphical strikethrough 906) from the one or more characters included in the words "quick brown fox" included in text display region 904C to indicate that the one or more characters "quick brown fox" are deselected for deletion. That is, gesture module 107 may determine that a distance between first location 908A and a location of UI device 103 that detects the input unit satisfies the threshold distance represented by graphical boundary indicator 908B. In response, UI module 105 may continue to output graphical strikethrough 906 to indicate that the one or more characters "jumped" are selected for deletion, but may remove graphical strikethrough 906 from the one or more characters "quick brown fox" to indicate that the one or more characters "quick brown fox" are deselected for deletion. In this way, a computing device implementing techniques of this disclosure may output one or more graphical indicators representing one or more threshold distances that are satisfiable by gesture input to delete one or more characters of text included in a text display region.

Figure 11:
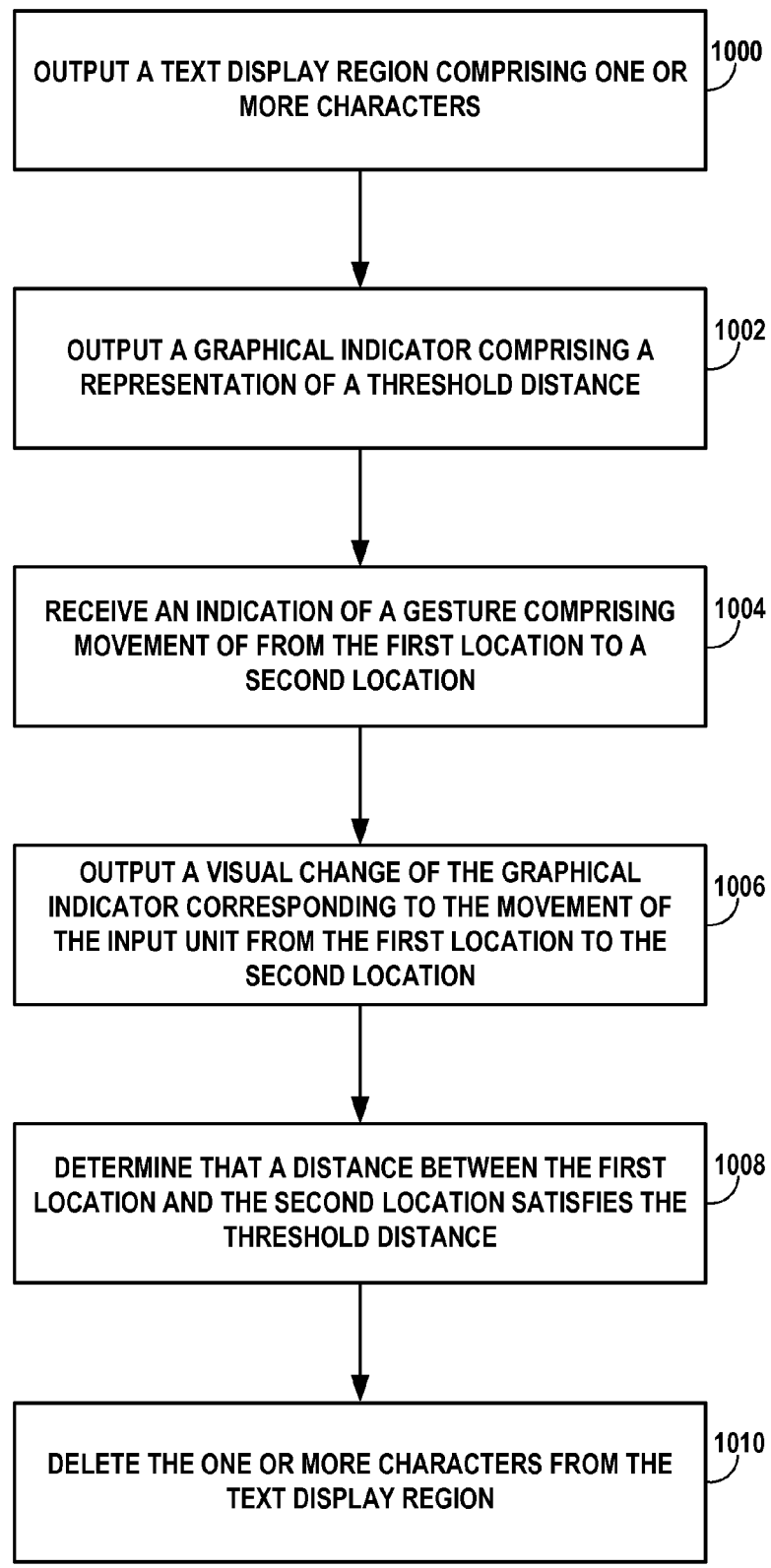
FIG. 11 is a flow diagram illustrating example operations of a computing device to display graphical content and delete one or more portions of the graphical content, in accordance with one or more techniques of the present disclosure.

FIG. 11 is a flow diagram illustrating example operations of a computing device to display graphical content and delete one or more portions of the graphical content, in accordance with one or more techniques of the present disclosure. For purposes of illustration only, the example operations are described below within the context of computing device 101, as shown in FIGS. 1 and 2.

Computing device 101 may output, for display (e.g., at a presence-sensitive display), a text display region comprising one or more characters (1000). For example, UI module 105, executing on one or more processors 200, may output, for display at UI device 103 (e.g., a presence-sensitive display), text display region 100 including the plurality of characters "The quick brown fox jumped". As one example, the plurality of characters "The quick brown fox jumped" may include a portion of the plurality of characters, the portion of the plurality of characters comprising the one or more characters "jumped" (i.e., one or more characters included in a word of text).

Responsive to receiving an indication of an input unit detected at a first location of a presence-sensitive input device, computing device 101 may output, for display, a graphical indicator comprising a representation of a threshold distance (1002). As an example, gesture module 107 may receive an indication of an input unit (e.g., a finger, pen, stylus, etc.) detected at first location 112A of UI device 103. In response, gesture module 107 may cause UI module 105 to output graphical indicator 106. Graphical indicator 106 may include a representation of a threshold distance, such as a threshold distance from first location 112A to second location 112B.

Computing device 101 may receive an indication of a gesture detected at the presence-sensitive input device, the gesture comprising movement of the input unit from the first location of the presence-sensitive input device to a second location of the presence-sensitive input device (1004). For instance, gesture module 107 may receive an indication of gesture 104 detected at UI device 103, gesture 104 including movement of the input unit from first location 112A to second location 112B.

Responsive to receiving the indication of the gesture, computing device 101 may output, for display, a visual change of the graphical indicator corresponding to the movement of the input unit from the first location to the second location (1006). For example, responsive to receiving the indication of gesture 104 from first location 112A to second location 112B, gesture module 107 may cause UI module 105 to output a visual change of graphical indicator 106 to indicate a distance between a location of UI device 103 that detects the input unit (e.g., third location 112C) and second location 112B.

Computing device 101 may determine that a distance between the first location and the second location satisfies the threshold distance (1008). For example, gesture module 107 may determine that a distance between first location 112A and second location 112B satisfies the threshold distance. Computing device 101 may delete, in response to determining that the threshold distance is satisfied, the one or more characters from the text display region (1010). For instance, in response to determining the distance between first location 112A and second location 112B satisfies the threshold distance, gesture module 107 may cause UI module 105 to deletion the one or more characters "jumped" from text display region 100.

In one example, outputting the visual change of the graphical indicator corresponding to the movement of the input unit from the first location to the second location comprises outputting the visual change of the graphical indicator to indicate a distance between a location of the presence-sensitive input device that detects the input unit and the second location. In one example, the operations include outputting, by computing device 101 and for display, a visual effect corresponding to the movement of the input unit, the visual effect indicating that the one or more characters are selected for deletion. In one example, the visual effect comprises a graphical strikethrough of the one or more characters.

In one example, the gesture comprises a first portion and a second portion, the first portion comprises movement of the input unit from the first location to a third location that is positioned between the first location and the second location, the second portion comprises movement of the input unit from the third location towards the first location, and the operations further include removing, by computing device 101 and in response to receiving the indication of the second portion of the gesture, the visual effect from at least a portion of the one or more characters to indicate that the portion of the one or more characters is deselected for deletion. In one example, outputting the visual effect corresponding to the movement of the input unit comprises outputting the visual effect based at least in part on a distance between a location of the presence-sensitive input device that detects the input unit and the first location.

In one example, the operations include outputting, by computing device 101 and for display, a text window comprising the one or more characters, and outputting the visual effect indicating that the one or more characters are selected for selection comprises outputting the visual effect for display at the text window. In one example, the input unit comprises a first input unit, the gesture comprises a first gesture, and the operations further include: receiving, by computing device 101, an indication of a second gesture detected at the presence-sensitive input device, the second gesture comprising movement of the second input unit from a third location of the presence-sensitive input device to a fourth location of the presence-sensitive input device; and removing, by computing device 101 and responsive to receiving the indication of the second gesture, the visual effect from at least a portion of the one or more characters to indicate that the portion of the one or more characters is deselected for deletion. In such an example, deleting the one or more characters from the text display region comprises deleting the portion of the one or more characters that is selected for deletion. In one example, receiving the indication of the second gesture comprising the movement of the second input unit from the third location of the presence-sensitive input device to the fourth location of the presence-sensitive input device comprises receiving the indication of the second gesture from the third location to the fourth location in a direction towards the first location of the presence-sensitive input device.

In one example, the graphical indicator comprises a first graphical indicator, the threshold distance comprises a first threshold distance, the gesture comprises a first portion of the gesture and a second portion of the gesture, the first portion of the gesture comprises the movement of the input unit from the first location of the presence-sensitive input device to the second location of the presence-sensitive input device, and the operations further include: outputting, by computing device 101 and for display at the text display region, a plurality of characters comprising a first portion of the plurality of characters and a second portion of the plurality of characters, wherein the first portion of the plurality of characters comprises the one or more characters; in response to determining that the first threshold distance is satisfied, outputting, by computing device 101 and for display, a second graphical indicator comprising a representation of a second threshold distance; receiving, by computing device 101, an indication of the second portion of the gesture, the second portion of the gesture comprising movement of the input unit from the second location of the presence-sensitive input device to a third location of the presence-sensitive input device; responsive to receiving the indication of the second portion of the gesture, outputting, by computing device 101 for display, a visual change of the second graphical indicator corresponding to the movement of the input unit from the second location to the third location; determining, by computing device 101, that a distance between the second location and the third location satisfies the second threshold distance; and deleting, by computing device 101 and in response to determining that the second threshold distance is satisfied, the second portion of the plurality of characters from the text display region.

In one example, the operations include outputting, by computing device 101 and for display at the text display region, a plurality of characters comprising a line of text, wherein the plurality of characters comprises the one or more characters, and wherein deleting the one or more characters from the text display region comprises deleting the plurality of characters comprising the line of text from the text display region. In one example, deleting the plurality of characters comprising the line of text comprises deleting the plurality of characters in response to determining that the gesture comprising the movement of the input unit from the first location of the presence-sensitive input device to the second location of the presence-sensitive input device comprises movement in a direction from the first location to the second location that is substantially orthogonal to a visual orientation of the text display region.

In one example, the input unit comprises a first input unit, the gesture comprises a first gesture, and the operations further include: outputting, by computing device 101 and for display at the text display region, a plurality of characters comprising a word, wherein the plurality of characters comprises the one or more characters; and receiving, by computing device 101, an indication of a second gesture detected at the presence-sensitive input device, the second gesture comprising movement of the second input unit from a third location of the presence-sensitive input device to a fourth location of the presence-sensitive input device, wherein deleting the one or more characters from the text display region comprises deleting, in response to receiving the indication of the second gesture, the plurality of characters comprising the word from the text display region.

In one example, the operations include: outputting, by computing device 101 and for display at the text display region, a plurality of characters comprising a first portion of the plurality of characters and a second portion of the plurality of characters, wherein the first portion of the plurality of characters comprises the one or more characters; determining, by computing device 101, that the input unit is detected at the second location for a threshold amount of time; and deleting, by computing device 101 and in response to determining that the input unit is detected at the second location for the threshold amount of time, the second portion of the plurality of characters from the text display region. In one example, the operations include outputting, by computing device 101 and for display, a graphical keyboard, wherein the first location is associated with a delete key of the graphical keyboard.

In one example, outputting the graphical indicator for display further comprises outputting the graphical indicator for display in response to determining, by computing device 101, that the input unit is detected at the first location for a threshold amount of time. In one example, outputting the graphical indicator comprising the representation of the threshold distance comprises outputting the graphical indicator that extends from a third location to a fourth location. In one example, the third location comprises a location that is at or near the first location, and the fourth location comprises a location that is at or near the second location.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
outputting, by a computing device and for display, a text display region comprising one or more characters;
responsive to receiving an indication of an input unit detected at a first location of a presence-sensitive input device, outputting, by the computing device and for display, a graphical indicator comprising a representation of a threshold distance;
receiving, by the computing device, an indication of a gesture detected at the presence-sensitive input device, the gesture comprising movement of the input unit from the first location of the presence-sensitive input device to a second location of the presence-sensitive input device;
responsive to receiving the indication of the gesture, outputting, by the computing device and for display, a visual change of the graphical indicator corresponding to the movement of the input unit from the first location to the second location;
determining, by the computing device, that a distance between the first location and the second location satisfies the threshold distance; and
deleting, by the computing device and in response to determining that the threshold distance is satisfied, the one or more characters from the text display region.

2. The method of claim 1, wherein outputting the visual change of the graphical indicator corresponding to the movement of the input unit from the first location to the second location comprises outputting the visual change of the graphical indicator to indicate a distance between a location of the presence-sensitive input device that detects the input unit and the second location.

3. The method of claim 1, further comprising outputting, by the computing device and for display, a visual effect corresponding to the movement of the input unit, the visual effect indicating that the one or more characters are selected for deletion.

4. The method of claim 3, wherein the visual effect comprises a graphical strikethrough of the one or more characters.

5. The method of claim 3, wherein the gesture comprises a first portion and a second portion, wherein the first portion comprises movement of the input unit from the first location to a third location that is positioned between the first and the second location, and wherein the second portion comprises movement of the input unit from the third location towards the first location, the method further comprising:
removing, by the computing device and in response to receiving the indication of the second portion of the gesture, the visual effect from at least a portion of the one or more characters to indicate that the portion of the one or more characters is deselected for deletion.

6. The method of claim 3, wherein outputting the visual effect corresponding to the movement of the input unit comprises outputting the visual effect based at least in part on a distance between a location of the presence-sensitive input device that detects the input unit and the first location.

7. The method of claim 3, further comprising outputting, by the computing device and for display, a text window comprising the one or more characters, wherein outputting the visual effect indicating that the one or more characters are selected for selection comprises outputting the visual effect for display at the text window.

8. The method of claim 3, wherein the input unit comprises a first input unit, and wherein the gesture comprises a first gesture, the method further comprising:

receiving, by the computing device, an indication of a second gesture detected at the presence-sensitive input device, the second gesture comprising movement of the second input unit from a third location of the presence-sensitive input device to a fourth location of the presence-sensitive input device; and
removing, by the computing device and responsive to receiving the indication of the second gesture, the visual effect from at least a portion of the one or more characters to indicate that the portion of the one or more characters is deselected for deletion, wherein deleting the one or more characters from the text display region comprises deleting the portion of the one or more characters that is selected for deletion.

9. The method of claim 8, wherein receiving the indication of the second gesture comprising the movement of the second input unit from the third location of the presence-sensitive input device to the fourth location of the presence-sensitive input device comprises receiving the indication of the second gesture from the third location to the fourth location in a direction towards the first location of the presence-sensitive input device.

10. The method of claim 1, wherein the graphical indicator comprises a first graphical indicator, wherein the threshold distance comprises a first threshold distance, wherein the gesture comprises a first portion of the gesture and a second portion of the gesture, and wherein the first portion of the gesture comprises the movement of the input unit from the first location of the presence-sensitive input device to the second location of the presence-sensitive input device, the method further comprising:
outputting, by the computing device and for display at the text display region, a plurality of characters comprising a first portion of the plurality of characters and a second portion of the plurality of characters, wherein the first portion of the plurality of characters comprises the one or more characters;
in response to determining that the first threshold distance is satisfied, outputting, by the computing device and for display, a second graphical indicator comprising a representation of a second threshold distance;
receiving, by the computing device, an indication of the second portion of the gesture, the second portion of the gesture comprising movement of the input unit from the second location of the presence-sensitive input device to a third location of the presence-sensitive input device;
responsive to receiving the indication of the second portion of the gesture, outputting, by the computing device and for display, a visual change of the second graphical indicator corresponding to the movement of the input unit from the second location to the third location;
determining, by the computing device, that a distance between the second location and the third location satisfies the second threshold distance; and
deleting, by the computing device and in response to determining that the second threshold distance is satisfied, the second portion of the plurality of characters from the text display region.

11. The method of claim 1, further comprising outputting, by the computing device and for display at the text display region, a plurality of characters comprising a line of text, wherein the plurality of characters comprises the one or more characters, and wherein deleting the one or more characters from the text display region comprises deleting the plurality of characters comprising the line of text from the text display region.

12. The method of claim 11, wherein deleting the plurality of characters comprising the line of text comprises:
deleting the plurality of characters in response to determining that the gesture comprising the movement of the input unit from the first location of the presence-sensitive input device to the second location of the presence-sensitive input device comprises movement in a direction from the first location to the second location that is substantially orthogonal to a visual orientation of the text display region.

13. The method of claim 1, wherein the input unit comprises a first input unit, and wherein the gesture comprises a first gesture, the method further comprising:
outputting, by the computing device and for display, a plurality of characters comprising a word, wherein the plurality of characters comprises the one or more characters; and
receiving, by the computing device, an indication of a second gesture detected at the presence-sensitive input device, the second gesture comprising movement of the second input unit from a third location of the presence-sensitive input device to a fourth location of the presence-sensitive input device, wherein deleting the one or more characters from the text display region comprises deleting, in response to receiving the indication of the second gesture, the plurality of characters comprising the word from the text display region.

14. The method of claim 1, further comprising;
outputting, by the computing device and for display at the text display region, a plurality of characters comprising a first portion of the plurality of characters and a second portion of the plurality of characters, wherein the first portion of the plurality of characters comprises the one or more characters;
determining, by the computing device, that the input unit is detected at the second location for a threshold amount of time; and
deleting, by the computing device and in response to determining that the input unit is detected at the second location for the threshold amount of time, the second portion of the plurality of characters from the text display region.

15. The method of claim 1, further comprising outputting, by the computing device and for display, a graphical keyboard, wherein the first location is associated with a delete key of the graphical keyboard.

16. The method of claim 1, wherein outputting the graphical indicator for display further comprises outputting the graphical indicator for display in response to determining, by the computing device, that the input unit is detected at the first location for a threshold amount of time.

17. The method of claim 1, wherein outputting the graphical indicator comprising the representation of the threshold distance comprises outputting the graphical indicator that extends from a third location to a fourth location.

18. The method of claim 17, wherein the third location comprises a location that is at or near the first location, and wherein the fourth location comprises a location that is at or near the second location.

19. A computer-readable storage medium encoded with instructions that, when executed, cause at least one processor of a computing device to:
output, for display, a text display region comprising one or more characters;
responsive to receiving an indication of an input unit detected at a first location of a presence-sensitive input device, output, for display, a graphical indicator comprising a representation of a threshold distance;
receive an indication of a gesture detected at the presence-sensitive input device, the gesture comprising movement of the input unit from the first location of the presence-sensitive input device to a second location of the presence-sensitive input device;
responsive to receiving the indication of the gesture, output, for display, a visual change of the graphical indicator corresponding to the movement of the input unit from the first location to the second location;
determine that a distance between the first location and the second location satisfies the threshold distance; and
delete, in response to determining that the threshold distance is satisfied, at least a portion of the one or more characters from the text display region.

20. A device comprising:
at least one processor;
a presence-sensitive input device; and
at least one module operable by the at least one processor to:
output, for display, a text display region comprising one or more characters;
responsive to receiving an indication of an input unit detected at a first location of the presence-sensitive input device, output, for display, a graphical indicator comprising a representation of a threshold distance;
receive an indication of a gesture detected at the presence-sensitive input device, the gesture comprising movement of the input unit from the first location of the presence-sensitive input device to a second location of the presence-sensitive input device;
responsive to receiving the indication of the gesture, output, for display, a visual change of the graphical indicator corresponding to the movement of the input unit from the first location to the second location;
determine that a distance between the first location and the second location satisfies the threshold distance; and
delete, in response to determining that the threshold distance is satisfied, the one or more characters from the text display region.

* * * * *